(12) United States Patent
Eyerman et al.

(10) Patent No.: US 10,684,858 B2
(45) Date of Patent: Jun. 16, 2020

(54) INDIRECT MEMORY FETCHER

(71) Applicant: Intel Corporation, Santa Clara, CA (US)

(72) Inventors: Stijn Eyerman, Evergem (BE); Wim Heirman, Ghent (BE); Kristof Du Bois, Aalst (BE); Ibrahim Hur, Portland, OR (US); Joshua B. Fryman, Corvallis, OR (US)

(73) Assignee: Intel Corporation, Santa Clara, CA (US)

( * ) Notice: Subject to any disclaimer, the term of this patent is extended or adjusted under 35 U.S.C. 154(b) by 75 days.

(21) Appl. No.: 15/996,184

(22) Filed: Jun. 1, 2018

(65) Prior Publication Data

US 2019/0369998 A1 Dec. 5, 2019

(51) Int. Cl.
  *G06F 9/38* (2018.01)
  *G06F 9/30* (2018.01)
(52) U.S. Cl.
  CPC ........ *G06F 9/3802* (2013.01); *G06F 9/30043* (2013.01); *G06F 9/3818* (2013.01)
(58) Field of Classification Search
  CPC .............................. G06F 9/3802; G06F 9/3818
  See application file for complete search history.

(56) References Cited

U.S. PATENT DOCUMENTS

| 7,293,162 B2 * | 11/2007 | Shebanow | G06F 9/3824 |
| | | | 712/217 |
| 2002/0053038 A1 * | 5/2002 | Buyuktosunoglu | G06F 1/3203 |
| | | | 713/320 |
| 2012/0151156 A1 | 6/2012 | Citron et al. | |

(Continued)

FOREIGN PATENT DOCUMENTS

| WO | 2016/105755 A1 | 6/2016 |
| WO | 2017/117458 A1 | 7/2017 |

OTHER PUBLICATIONS

Chung et al., "Application Data Prefetching on the IBM Blue Gene/Q Supercomputer", SC '12: Proceedings of the International Conference on High Performance Computing, Networking, Storage and Analysis, Nov. 2012, 8 pages.

(Continued)

*Primary Examiner* — Farley Abad
(74) *Attorney, Agent, or Firm* — Nicholson de Vos Webster & Elliott LLP

(57) ABSTRACT

Disclosed embodiments relate to an indirect memory fetch (IMF) unit. In one example, an apparatus includes circuitry to fetch and decode an instruction specifying a sparse operand array including N operands, and an index array including N contiguously-addressed indices. The apparatus further includes a processing engine associated with an IMF unit to respond to the decoded instruction by initializing the IMF unit to fetch the N operands in order, probing the IMF unit to determine that a fetched operand is ready to retrieve, retrieving the fetched operand from the IMF unit, and repeating the probing and retrieving until all N operands have been retrieved. The IMF unit, independent of the processing engine, is to fetch the N contiguously-addressed indices from the index array, use the N fetched indices to calculate memory addresses for the N operands, and issue a plurality of read requests to fetch the N operands in order.

20 Claims, 20 Drawing Sheets

(56) References Cited

U.S. PATENT DOCUMENTS

2013/0326160 A1 12/2013 Sperber et al.
2017/0177346 A1* 6/2017 Gokhale ............. G06F 12/0862

OTHER PUBLICATIONS

European Search Report and Search Opinion, EP App. No. 19170431.1, dated Oct. 30, 2019, 13 pages.
Yu el al., "IMP: Indirect Memory Prefetcher", 48th Annual IEEE/ACM International Symposium on Microarchitecture (MICRO), 2015, 13 pages.

* cited by examiner

INDIRECT MEMORY FETCH (IMF) INSTRUCTION 601

| Opcode DO-IMF 602 | AAddr 604 | ASize 606 | BAddr 608 | BSize 610 | N 612 |

620

---

If *n* > 0 and *next_free*->address == 0:
    Initiate load from address *BAddr* with size *BSize* and target *next_free*->address
    *BAddr* += *BSize*
    *n*--
621

---

If *next_free*->address <> 0 and not *fifo_full* and a PTR is available:
    *next_free*->address = *AAddr* + *next_free*->address * *ASize*
    Allocate free PTR *p* with the calculated address and the value of *next_free*
    Initiate load from *next_free*->address with size *ASize* and target PTR *p*
    *next_free* ++ (circular)
    if *next_free* == *ready_head*:
        *fifo_full* = true
622

---

When load data returns from memory
    Find corresponding PTR and copy data to the FIFO element stored in the PTR
    Deallocate PTR
    if FIFO element == *ready_tail*:
        while *ready_tail* contains data and *ready_tail* <> *next_free*:
            *ready_tail* ++ (circular)
623

---

When core requests data element:
    if IMF not initialized, return error
    while *ready_tail* == *ready_head*:
        wait until data returns from memory
    send data at *ready_head* to core
    *ready_head*->address = 0
    *ready_head* ++ (circular)
    if *fifo_full*:
        *fifo_full* = false
624

FIG. 6

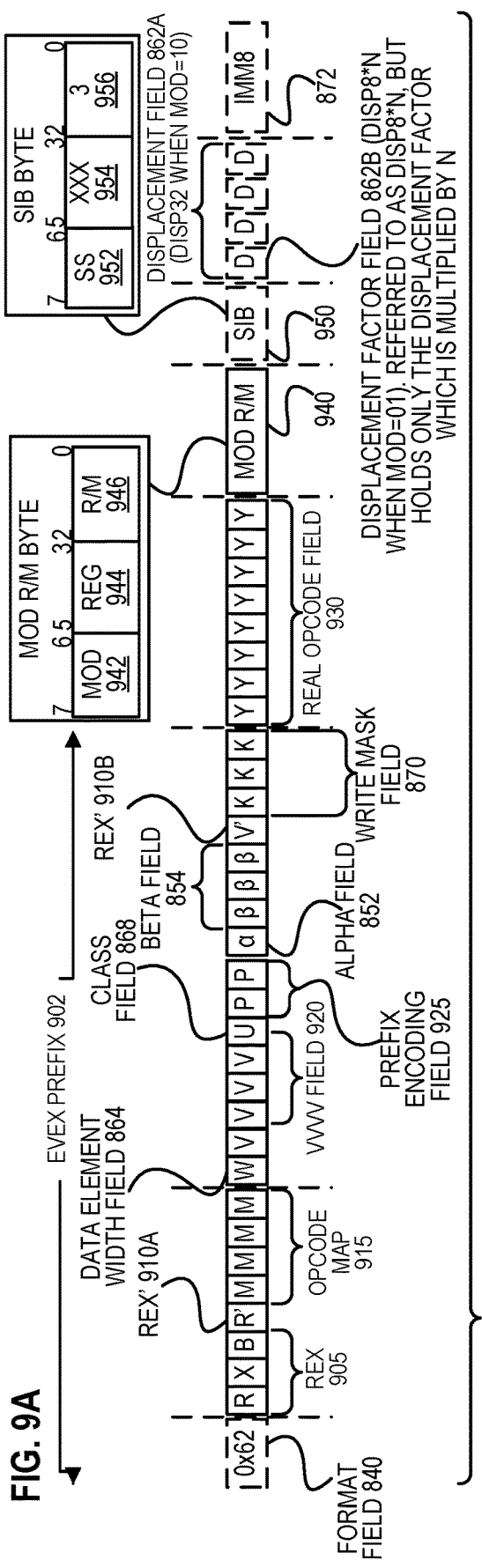
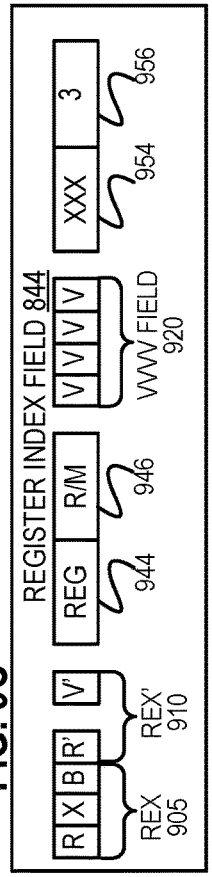
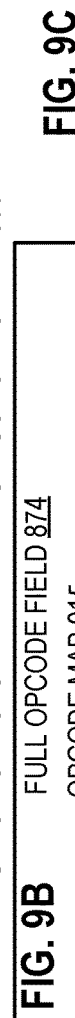
FIG. 9A
FIG. 9B
FIG. 9C

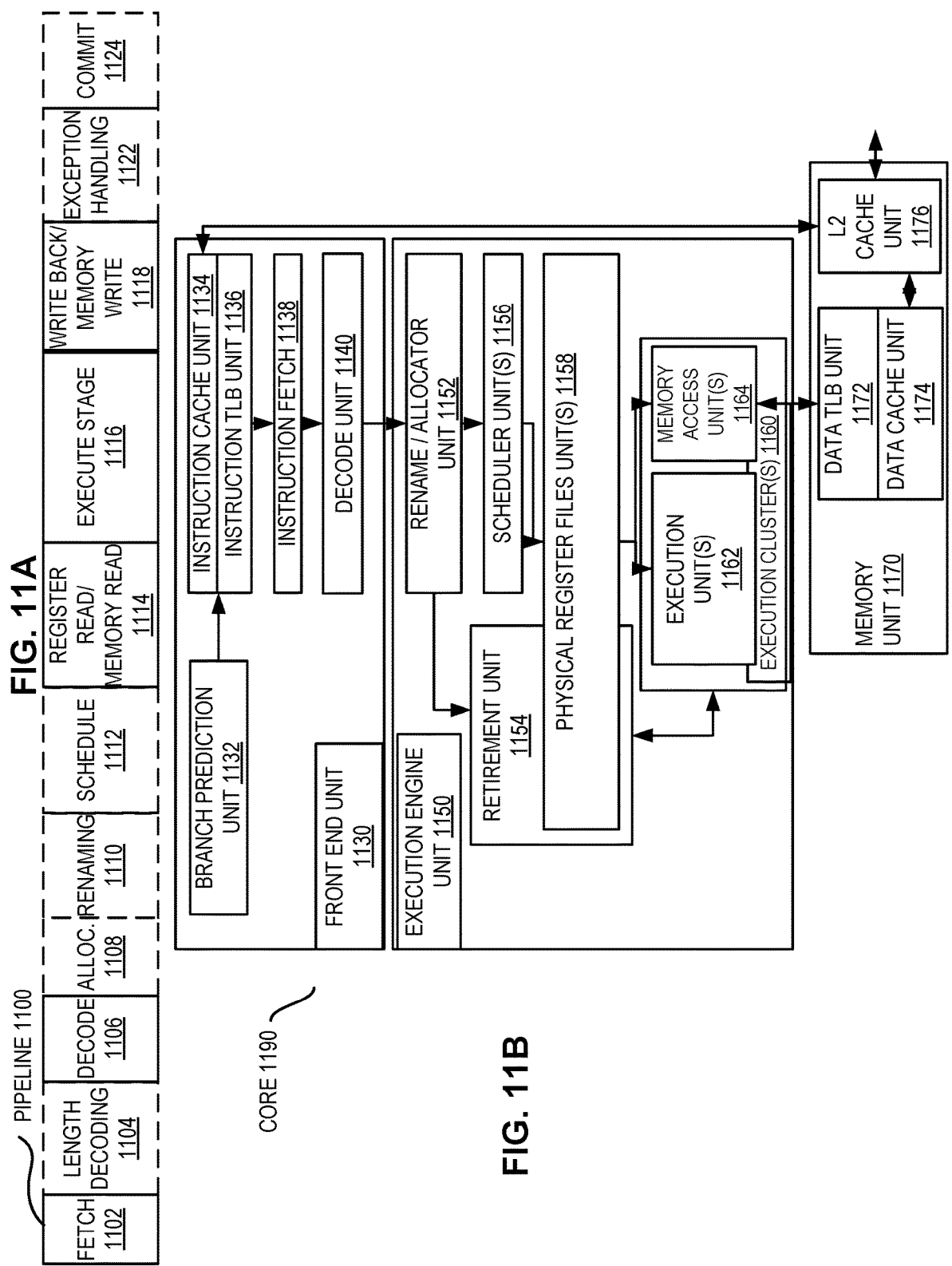

INDIRECT MEMORY FETCHER

STATEMENT OF GOVERNMENT INTEREST

This invention was made with government support under contract number HR0011-17-3-004, awarded by DARPA. The government has certain rights in this invention.

FIELD OF THE INVENTION

The field of invention relates generally to computer processor architecture, and, more specifically, to an indirect memory fetcher.

BACKGROUND

Big data analysis, applied in many applications, including machine learning, deep learning, and social network analysis, to name a few, often operate on very large data sets with sparse connections. Indirect memory accesses, which are becoming more important in big data analysis, are memory accesses in the form of A[B[i]], i.e., the content of one array (B) is used to index a second array (A). Accesses to the B-Array are sequential, meaning that loading the contents of B[i] is handled well by the conventional cache and prefetchers. However, the data in B is irregular, meaning that the access pattern to A is irregular.

This access pattern is common for applications with sparse data, e.g., sparse matrices and graphs, which are used in big data analysis. For example, the neighbors of a vertex in a graph are stored as an array of vertex IDs. A common operation in graph applications is to fetch data from all neighbors of a vertex, and combine this to calculate its own data, e.g., the page rank of a vertex is determined by the page rank value of its neighbors. The list of neighbors is therefore used to index the A-Array, i.e., an indirect memory access pattern.

Because of the irregularity and sparsity of the A-Array, existing prefetchers cannot predict this address stream. Furthermore, the accessed data structure is often too big to be cached, meaning that the fetched data and its corresponding cache line is likely to be evicted before being accessed again. This makes inefficient use of caches, and wastes memory bandwidth, as only one element on a cache line is effectively used. As a result, threads and cores are often halted, waiting on data to be fetched from main memory.

BRIEF DESCRIPTION OF THE DRAWINGS

The present invention is illustrated by way of example and not limitation in the figures of the accompanying drawings, in which like references indicate similar elements and in which:

FIG. 6 is pseudocode illustrating a core processor using an indirect memory fetcher, according to some embodiments;

FIG. 8A is a block diagram illustrating a generic vector friendly instruction format and class A instruction templates thereof according to embodiments of the invention;

FIG. 8B is a block diagram illustrating the generic vector friendly instruction format and class B instruction templates thereof according to embodiments of the invention;

FIG. 9A is a block diagram illustrating an exemplary specific vector friendly instruction format according to embodiments of the invention;

FIG. 9B is a block diagram illustrating the fields of the specific vector friendly instruction format that make up the full opcode field according to one embodiment of the invention;

FIG. 9C is a block diagram illustrating the fields of the specific vector friendly instruction format that make up the register index field according to one embodiment of the invention;

FIG. 11A is a block diagram illustrating both an exemplary in-order pipeline and an exemplary register renaming, out-of-order issue/execution pipeline according to embodiments of the invention;

FIG. 11B is a block diagram illustrating both an exemplary embodiment of an in-order architecture core and an exemplary register renaming, out-of-order issue/execution architecture core to be included in a processor according to embodiments of the invention;

FIG. 12A is a block diagram of a single processor core, along with its connection to the on-die interconnect network and with its local subset of the Level 2 (L2) cache, according to embodiments of the invention;

FIG. 12B is an expanded view of part of the processor core in FIG. 12A according to embodiments of the invention;

FIG. 14 shown a block diagram of a system in accordance with one embodiment of the present invention;

FIG. 15 is a block diagram of a first more specific exemplary system in accordance with an embodiment of the present invention;

FIG. 16 is a block diagram of a second more specific exemplary system in accordance with an embodiment of the present invention;

FIG. 17 is a block diagram of a System-on-a-Chip (SoC) in accordance with an embodiment of the present invention.

DETAILED DESCRIPTION OF THE EMBODIMENTS

Figure 1:
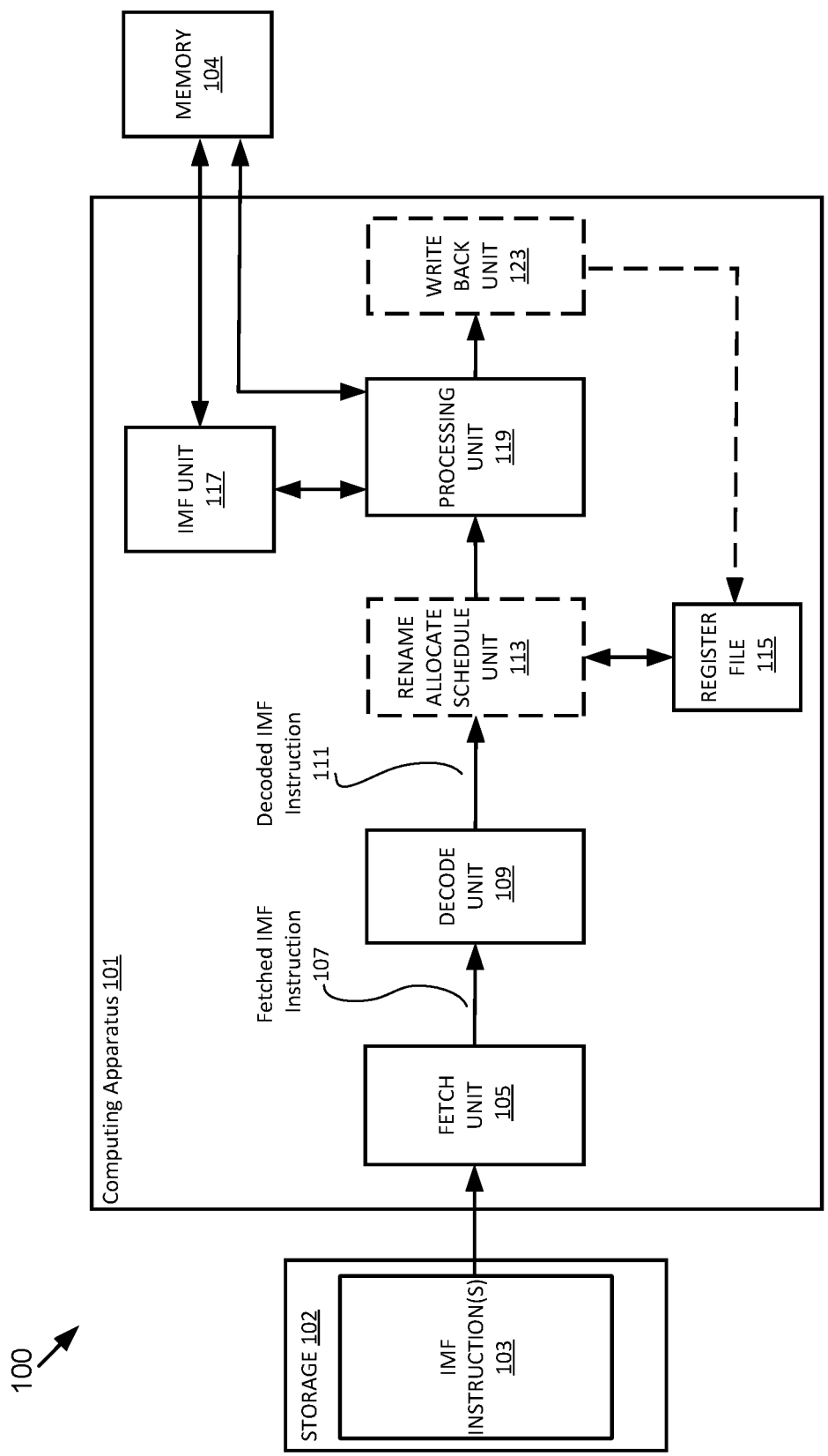
FIG. 1 is a block diagram illustrating processing components for executing an indirect memory fetch (IMF) instruction, according to an embodiment.

In the following description, numerous specific details are set forth. However, it is understood that some embodiments may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described about an embodiment, it is submitted that it is within the knowledge of one skilled in the art to affect such feature, structure, or characteristic about other embodiments if explicitly described.

Disclosed embodiments aim to hide memory latency resulting from indirect memory accesses. An indirect memory fetch (IMF) unit is provided to offload the indirect memory accesses from a processing engine, thereby allowing the processing engine to perform useful work while waiting for data to arrive. The disclosed IMF unit is useful in applications that use indirect memory accesses, which in some embodiments means that the access pattern to an array containing operands is generated by an array of indices or pointers stored in memory.

The disclosed IMF unit, in some embodiments, gathers operands from a sparse operand array, in which the operands are dispersed over a wide memory range. This access pattern often lacks special locality and is therefore not optimized by typical caches or prefetchers, the use of which can even disturb efficiency by wasting cache capacity and memory bandwidth.

The processing engine of the disclosed embodiments can be any one or more of a processor, a multiprocessor (e.g., a computing apparatus with more than one central processing unit), a processing core (e.g., a basic computational unit of a computing apparatus, one or more of which can be included in a processor), an embedded processor (e.g., a microprocessor used in an embedded system), a cell processor, and a thread of a multi-threaded (or hyper-threaded) processor.

In some embodiments, the disclosed IMF unit is added to a processing engine (or each hardware context on a core), and autonomously loads data from memory using an indirect stream. These IMF units are activated and initialized by the core, after which they operate concurrently with the normal thread execution on the processor core.

In some embodiments, the fetched data is stored in a circular first-in, first-out (FIFO) queue, which is accessed by the core whenever it needs the data. The FIFO is used to deliver the fetched operands to the processing engine in order, alleviating the core from address calculation and issuing load operations. The data is sent to the core using a simple FIFO queue.

In some embodiments, the disclosed IMF unit is an accelerator that operates closely with a processor core (one accelerator per core or hardware thread) and that is responsible for loading indirect memory streams (the indirect memory fetch unit). The accelerator autonomously fetches the data from memory, and reports status when probed.

By offloading indirect memory fetches from the processing engine, the disclosed IMF unit improves performance of a computing apparatus by allowing the processing engine to perform other, useful work. Because most data cannot be cached or prefetched, it needs to be fetched from main memory, which takes in the order of 100 compute cycles or more. This latency cannot be hidden, even by the most advanced out-of-order pipeline cores. Therefore, a lot of time is spent in waiting for memory operations, not using the available compute capacity.

By performing indirect memory accesses using an IMF unit, disclosed embodiments avoid reliance on conventional caching systems and the resulting waste cache capacity and memory bandwidth, degrading the performance of regular memory operations.

The disclosed IMF unit, by performing the indirect memory fetches independently of the processing engine, improves processor performance by not relying on the processor to calculate operand addresses, and frees up the processor to work on other, useful work.

Disclosed embodiments thus improve the performance of applications with indirect memory operations. Furthermore, disclosed embodiments use cache capacity and memory bandwidth more efficiently, increasing the performance for co-running applications or regular memory streams in the same application.

One of the advantages of the IMF unit is that it takes the responsibility for fetching the data away from the core, which can then focus more on the actual computation. Loading data and computation is done in separate concurrent units, whereas conventionally, the core is responsible for both. Especially for in-order processors, which usually support only one outstanding long-latency load, this can largely increase the memory level parallelism (MLP) and hide much of the memory latency. But even out-of-order processors are limited in the MLP they can exploit; adding an IMF unit can increase MLP beyond this boundary. With an IMF unit, a single thread can launch more concurrent memory operations, meaning that memory bandwidth can be saturated—making optimal use of the memory resources—with fewer threads and fewer cores. This reduces the need for finding massive parallelism in the software and can reduce the chip size by implementing fewer cores.

A secondary advantage of the IMF unit is the reduction in cache pollution and the reduction in bandwidth usage if subline DRAM accesses are available. This will benefit other concurrent programs, or more regular phases of the same application. It also allows for running more threads of the same application, because more memory bandwidth is available.

FIG. 1 is a block diagram illustrating processing components for executing an indirect memory fetch (IMF) instruction, according to some embodiments. As shown, system 100 includes computing apparatus 101, storage 102 to store IMF instruction(s) 103 to be executed, and memory 104.

As used herein, computing apparatus 101 may consist of, and may be referred to as a multiprocessor, a processing core, an embedded processor, a cell processor, a virtual machine, and a multi-threaded processor. In some embodiments (not shown), computing apparatus 101 is further to include one or more additional processing engines (units), each associated with a unique IMF unit. In such multi-processing unit embodiments, computing apparatus 101 is to fetch and decode, using one or more fetch and decode units, one or more additional instances of the IMF instruction(s) 103 and to use the one or more additional processing units execute the one or more additional instances of the IMF instruction(s) 103.

In operation, computing apparatus 101 is to use fetch unit 105 to fetch IMF instruction(s) 103 from storage 102. Fetch unit 105 in some embodiments is hardware circuitry, and in some embodiments is emulated circuitry. IMF instruction(s) 103 are formatted according to an IMF instruction format, which is further illustrated and described with respect to FIGS. 7, 8A-B, and 9A-D, and which has fields (not shown here) to specify an opcode, a sparse operand array containing N operands (dispersed a logical array, which can be larger than a cache line or even larger than a page size), and a contiguous index array containing N indices (contiguously arranged in memory). In some embodiments, the IMF instruction further specifies a value for N, as well as other optional parameters.

The fetched IMF instruction 107 is to be decoded by decode unit 109, which is to decode the fetched IMF instruction 107 into one or more operations. In some embodiments, fetched IMF instruction 107 specifies an opcode selected from an instruction set architecture of IMF unit 117. In some embodiments, decode unit 109 is to generate a plurality of micro-operations to be performed by execution circuitry (such as by processing unit 119). In some embodiments, the generated micro-instructions are selected from the instruction set architecture of IMF unit 117.

In some embodiments, rename, allocate, and schedule unit 113 provides functionality for one or more of: 1) renaming logical operand values to physical operand values (e.g., a register alias table in some embodiments), 2) allocating status bits and flags to the decoded instruction, and 3) scheduling the decoded IMF instruction 111 for execution on processing unit 119. Rename, allocate, and schedule unit 113 is optional, as indicated by its dashed border, insofar as its provided functionality may occur at a different time, or not at all.

Processing unit 119 is to receive and respond to the decoded IMF instruction 111, which may include configuring the IMF unit 117 to perform the indirect memory fetch from memory 104. In some embodiments, processing unit 119 is execution circuitry, for example as illustrated and described with respect to FIGS. 11A-B and 12A-B. Execution of the IMF instruction by computing apparatus 101 is further described and illustrated below, at least with respect to FIGS. 2-6. Consistent with disclosed embodiments, processing unit 119 may also be referred to as a processing agent, a processing element, or execution circuitry.

The term, "unit," as used in FIG. 1, is a general term indicating that the "unit" may include hardware circuitry, emulated hardware, computer-executable instructions, or a combination of hardware and software. In some embodiments, for example, fetch unit 105 and decode unit 109 may be aptly referred to as fetch circuit and decode circuit, respectively.

Register file 115 is to store data as operands of decoded IMF instruction 111 to be operated on by processing unit 119. Exemplary register types include writemask registers, packed data registers, general purpose registers, and floating point registers, as further described and illustrated below, at least with respect to FIG. 10.

In some embodiments, write back unit 123 commits the result of the execution of the decoded IMF instruction 111. Write back unit 120 is optional, as indicated by its dashed border, insofar as a write back may occur at a different time, or not at all.

Processing unit 119 and computing apparatus 101 are further illustrated and described with respect to FIGS. 2-6, 11A-B and 12A-B.

Indirect Memory Fetch (IMF) Unit

Figure 2:
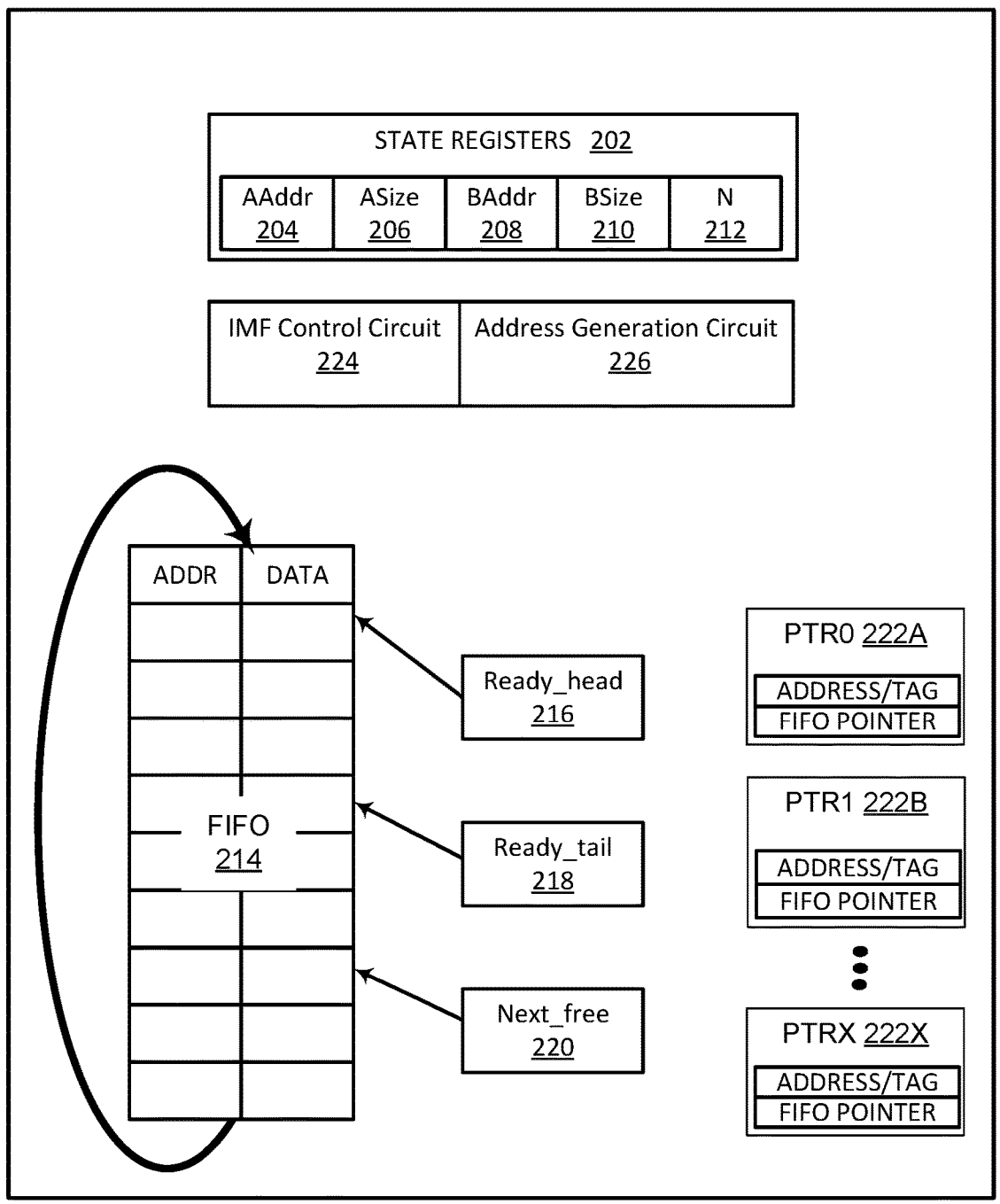
FIG. 2 is a block diagram illustrating execution of an indirect memory fetch (IMF) instruction, according to some embodiments.

FIG. 2 is a block diagram illustrating execution of an indirect memory fetch (IMF) instruction using an IMF unit, according to some embodiments. As shown, IMF unit 200 includes a first-in, first-out buffer, FIFO 214, for storing addresses and data. In some embodiments, all entries of FIFO 214 are initialized to zero before executing the IMF instruction.

As shown, IMF unit 200 includes state registers 202 for storing an IMF state. The state registers 202 include: AAddr 204, which is an address of an operand array (such as the A-Array, discussed above) containing N dispersed operands to be fetched; an operand size (ASize 206), in bytes, of the operands; BAddr 208, which is an address of an index array containing N contiguous indices, each index to identify a position of an operand within the operand array; an index size (BSize 210), in bytes, of the indices; and a number (N 212) of operands to be fetched. In operation, the IMF state registers are to be initialized by an associated processing engine to cause IMF unit 200 to perform an indirect memory fetch.

IMF unit 200 further includes some FIFO pointers, ready_head 216, ready_tail 218, and next_free 220, used to manage FIFO 214. The FIFO pointers hold the current status of the valid FIFO elements: ready_head 216 points to the first element that contains valid data, i.e., the next element that should be sent to the core; ready_tail 218 points to the element after the last valid element, which means that if read_head 216 and ready_tail 218 become equal, then there are no valid elements and the core needs to wait until the next element is received from memory; and next_free 220 points to the next element that can be allocated for a new element to fetch from the A-Array. The elements between ready_tail 218 and next_free 220 are pending fetches: elements whose fetch operation has already started, but whose data is not yet available.

IMF unit 200 further includes a number of pending transaction registers (PTRs): PTR0 222A, PTR1 222B, and PTRX 222X. The PTRs contain the status of the outstanding fetches, i.e., the elements between the ready_tail and next_free pointers. The number of PTRs is a design choice. The more PTRs, the more concurrent loads can be done, increasing memory level parallelism and performance. In operation, each PTR register is to contain the address of a read request sent to main memory, and a pointer to the element in the FIFO 214 where the data should be put when it arrives. In some embodiments, a PTR includes a transaction tag identifying the transaction Additionally, IMF unit 200 includes IMF control circuit 224 and address generation circuit 226. In some embodiments, when the indices in the B-Array specify the position of each of the N operands in the A-Array in terms of a number of elements offset from the base address, AAddr 204 (as shown and discussed, for example, with respect to FIG. 3), address generation circuit 226 is to calculate the address of each operand at index, idx, as (AAddr 204)+(BAddr[i- dx])*(ASize 206) (where BAddr[idx] is an index in the B-Array). In other embodiments, when the indices in the B-Array specify pointers to memory locations where each of the N operands in the A-Array is stored (as shown and discussed, for example, with respect to FIG. 4), the pointer specified by the B-Array is used, and AAddr 204 is set to 0.

In operation, as further described and illustrated with respect to FIGS. 3-6, a processing engine associated with IMF unit 200 is to fetch, using fetch circuitry, and decode, using decode circuitry, an IMF instruction having fields to specify an operand array (e.g., "A-Array") comprising N dispersed operands, and an index array (e.g., "B-Array") comprising N contiguous indices. The processing engine is to respond to the decoded IMF instruction by initializing IMF unit 200 to fetch, in order, the N operands, probing the IMF unit to determine readiness of one or more of the N operands, fetching the one or more of the N fetched operands from IMF unit 200, and repeating the probing and fetching until all N operands have been fetched from IMF unit 200.

For its part, once initialized by the processing engine, IMF unit 200, is to first fetch the N contiguous indices (from the B-Array), then fetch the N operands (from the A-Array) by issuing N read requests, two or more at a time (up to X read requests at a time, depending on how may PTR registers, PTR0-PTRX, are available), to N addresses calculated using the N fetched indices (by address generation circuit 226), store the N fetched operands in a memory (e.g., FIFO 214), in order, and provide the N operands in response to fetch requests from the processing engine.

Execution by the processing engine and IMF unit 200 are further described and illustrated below, with respect to FIGS. 3-6, FIGS. 11A-B and FIGS. 12A-B.

Indirect Memory Fetch (IMF) Unit Instruction Set Architecture

According to some embodiments, four new instructions are added to the instruction set architecture (ISA) of a computing apparatus (e.g. processor, multiprocessor, virtual machine): that incorporates an IMF unit. In some embodiments, the IMF unit supports at least three instructions to be used to control its operation, including: 1) Initialize (also referred to as imf_init or do_imf), 2) Fetch (imf_fetch_next), and 3) Cancel (imf_cancel or imf_stop). Some embodiments include a fourth instruction, Probe (imf_probe), that can be used to improve performance.

In the context of speculative instructions, some embodiments of speculative processors that incorporate an IMF unit respond to imf_init, imf_probe, imf_fetch_next, and imf_cancel instructions by generating one or more of at least three internal instructions to implement the speculative instructions: 1) Speculative_Initialize, 2) Speculative_Fetch, and 3) Commit_Speculative, as further detailed below.

INITIALIZE (e.g., imf_init, or do_imf) is used to initialize the IMF unit, and is used by a processing engine to initialize its associated IMF unit to fetch, in order, N operands from an operand array (A-Array, located at AAddr and having ASized elements). The IMF unit calculates the addresses of the operands using N indices provided in an index array (B-Array, located at BAddr and having N BSized elements).

In some embodiments, the imf_init instruction assumes that a number of elements to fetch, N, is predetermined and known beforehand. In other embodiments, N, is specified as an additional field in the imf_init instruction, or as a prefix or suffix to the opcode of the instruction. The format of the IMF instructions is further described and illustrated below, with respect to FIGS. 7, 8A-8B, and 9A-9B.

In some embodiments, the INITIALIZE instruction, as forwarded to the IMF unit, is fetched from a memory by fetch circuitry of a computing apparatus. In other embodiments, a computing apparatus fetches a DO-IMF instruction from storage, then uses decode circuitry to general several microoperations to control the response to the DO-IMF instruction. In such an embodiment, the INITIALIZE instruction is generated by decode circuitry as one of several micro-instructions generated by the decode circuitry (other micro-instructions generated by decode circuitry may include a PROBE instruction and a FETCH instruction, as detailed below).

PROBE: (e.g., imf_probe) is used by a processing engine to determine when one or more operands have been fetched and are ready to be fetched from the IMF unit.

FETCH: (e.g., (imf_fetch_next) is used by a processing engine to retrieve operands from the IMF unit. In some embodiments, the imf_fetch_next instruction blocks if the FIFO is empty, and it is the responsibility of the programmer or compiler to ensure that the number of fetches equals the number of elements set at initialization (or to cancel prematurely). These new instructions need to be inserted by the programmer or compiler.

CANCEL: (e.g., (imf_cancel or imf_stop) is used by a processing engine to stop the IMF unit in case the algorithm does not need to read all elements, e.g., when searching for a specific value and breaking the loop if there is a match.

Execution of an Indirect Memory Fetch (IMF) Instruction

Figure 3:
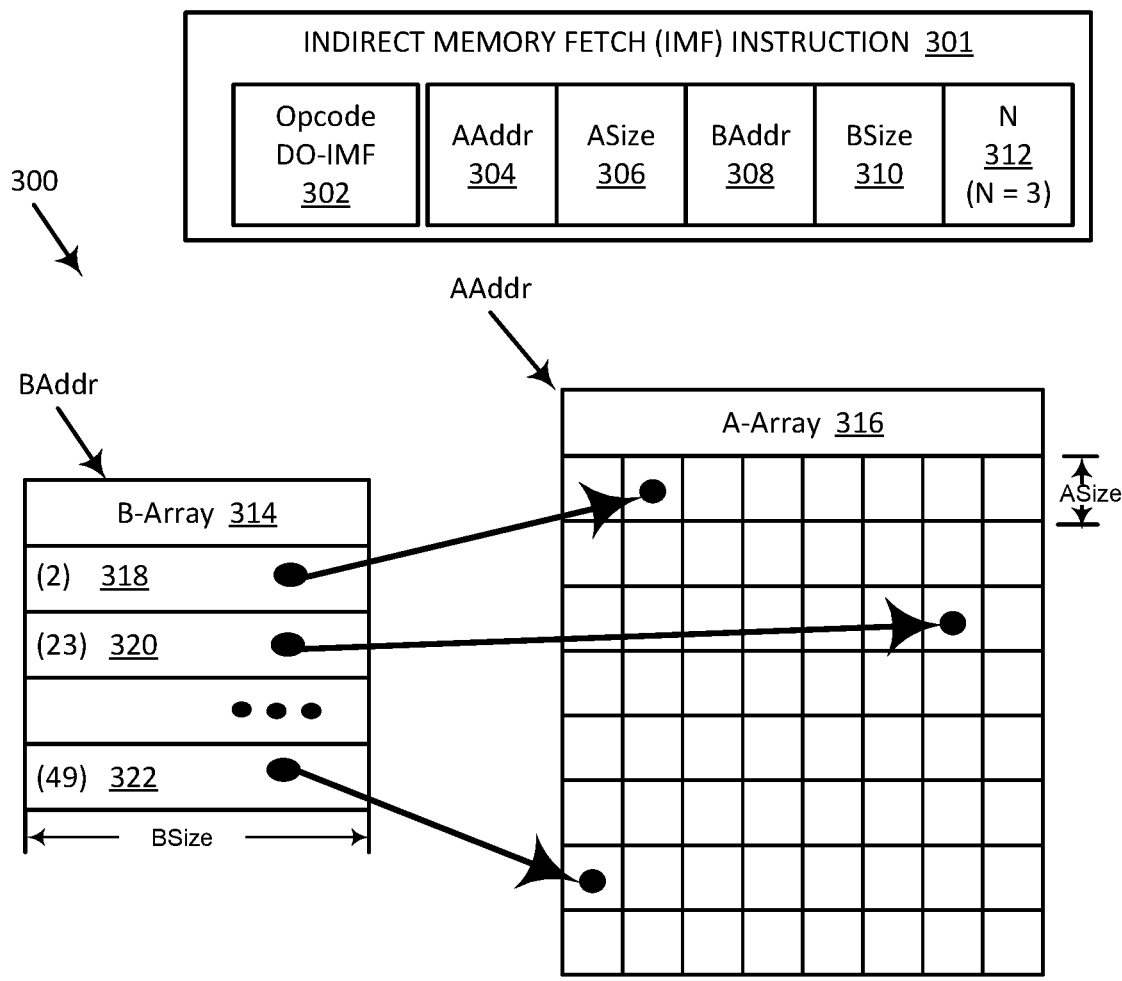
FIG. 3 is a block diagram illustrating execution of an indirect memory fetch (IMF) instruction, according to some embodiments.

FIG. 3 is a block diagram illustrating execution of an indirect memory fetch (IMF) instruction, according to some embodiments. As shown, a processing engine is to fetch, decode, and initialize an associated IMF unit 300 to perform an IMF instruction 301 having fields to specify an operand array (A-Array 316) containing N dispersed operands, and an index array (B-Array 314) containing N contiguous indices. As shown, IMF instruction 301 includes fields to specify an opcode (DO-IMF) 302, a base address of the A-Array, AAddr 304, an element-size of the A-Array, ASize 306, a base address of the B-Array, BAddr 308, an element size of the B-Array, BSize 310, and a number of operands, N 312 (i.e., 3).

Here, the operand array (A-Array 316) is a sparse array logically having 64 elements, arranged in an eight-row by eight-column matrix, of which three operands are to be fetched (so, N=3). It should be understood that the operand array (A-Array 316) may well have more than three valid or useful operands, but that the current fetch operation, as specified by IMF instruction 301, requires three operands to be fetched.

In this embodiment, the N indices in the index array (B-Array 314) specify the position of each of the N operands to be fetched from the operand array (A-Array 316) in terms of a number of elements offset from the base address (AAddr 204). For example, the first index 318 in the B-Array identifies an operand at offset (1) of the A-Array 316 (the first element being at offset (0)), so an address generation circuit is to calculate the address of the operand by adding ASize 306*(1-0) to the base address of the A-Array, AAddr 304.

Referring now to FIG. 3, in operation, as further described and illustrated with respect to FIGS. 2 and 4-6, a processing engine (not shown) associated with IMF unit 300 is to fetch, using fetch circuitry, and decode, using decode circuitry, an IMF instruction 301 having fields to specify an operand array (e.g., A-Array 316, specified by AAddr 304 and ASize 306) and containing N 312 dispersed operands, and an index array (e.g., B-Array 314, specified by BAddr 308 and BSize 310) and containing N contiguous indices. In some embodiments, as here, A-Array 316 is a sparse array having operands dispersed over a logically large array. Being contiguous, as used here, means the indices of the B-Array 314 are stored at contiguous locations, such as contiguous memory locations. The processing engine is to respond to the decoded IMF instruction by initializing IMF unit 300 to fetch, in order, the N operands, then probing the IMF unit to determine readiness of one or more of the N operands, and, if so, fetching the one or more of the N fetched operands from IMF unit 300, and repeating the probing and fetching until all N operands have been fetched from IMF unit 300.

For its part, once initialized by the processing engine, IMF unit 300, is to fetch one or more of the N contiguous indices (from B-Array 314, which is located at address BAddr 308, with each index having a size specified by BSize 310), then use the one or more indices to fetch one or more corresponding operands of the N operands (from the A-Array 316, which is logically an 8×8 matrix located the address specified by AAddr 304, and having three dispersed operands to be fetched at indexes 2, 23, and 49) by issuing N read requests, two or more at a time (up to X read requests at a time, depending on how may PTR registers, PTR0-PTRX, are available), to N addresses calculated using the N fetched indices (calculate by a circuit such as address generation circuit 226, of FIG. 2), store the N fetched operands in a memory (such as FIFO 214, of FIG. 2), in order, and provide the N operands in response to fetch requests from the processing engine. Note that the IMF unit 300 is to begin fetching operands from memory as soon as the first of the N indices is fetched from the index Array. In other words, according to some embodiments, the IMF unit 300 issues read requests to read operands while less than all of the N indices of the index array haven been loaded.

In some embodiments, IMF unit executes the IMF instruction independently of the processing engine, including calculating addresses with its own circuitry and issuing requests to a memory controller separately from the processing engine. This allows the processing engine to perform useful work while the IMF unit takes care of (and hides the latency) the indirect fetches. The IMF unit thereby reduces wait times and improves the performance of the processing engine.

Figure 4:
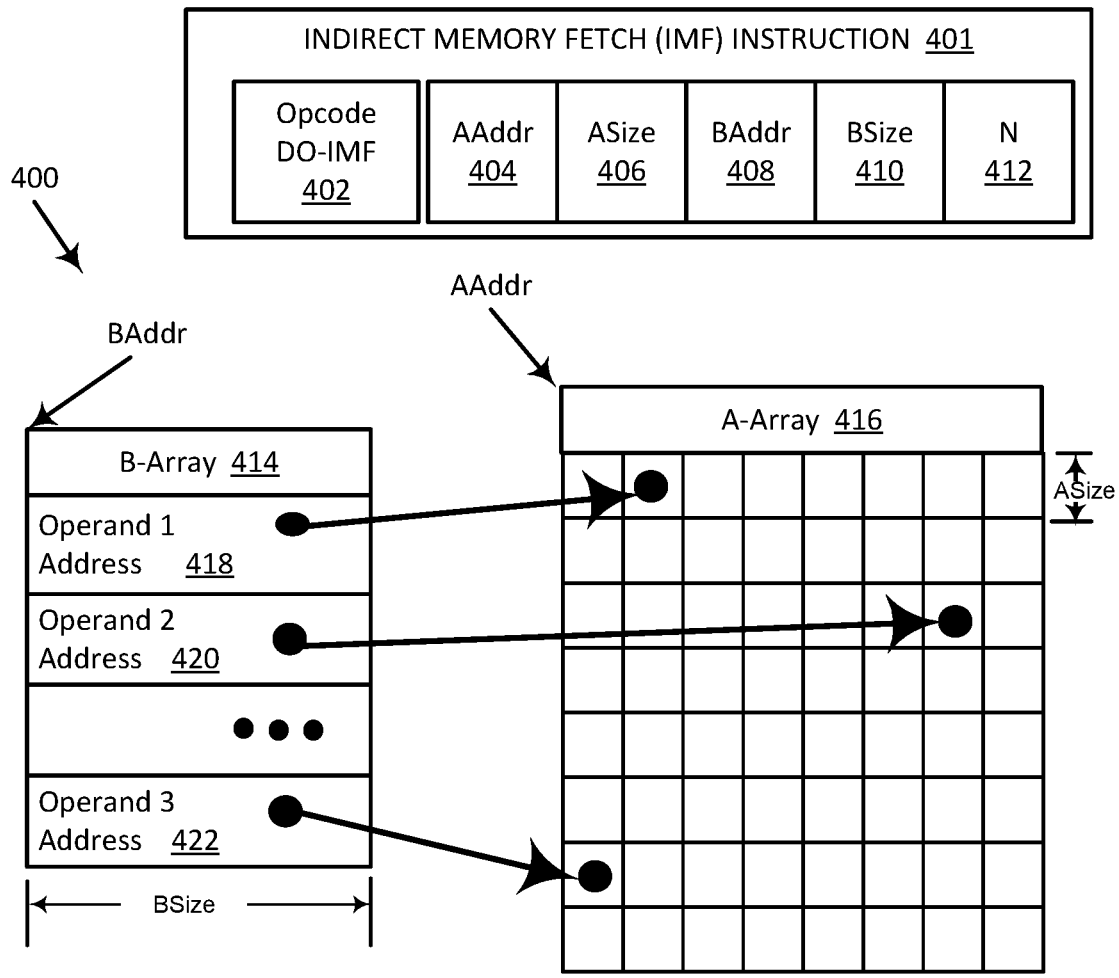
FIG. 4 is a block diagram illustrating execution of an indirect memory fetch (IMF) instruction, according to some embodiments.

FIG. 4 is a block diagram illustrating execution of an indirect memory fetch (IMF) instruction, according to some embodiments. As shown, a processing engine (not shown) is to fetch and decode indirect memory fetch (IMF) instruction 401 and initialize an associated IMF unit 400 to perform the IMF instruction 401 having fields to specify, an operand array (A-Array 416) containing N operands, and an index array (B-Array 414) containing N indices. In some embodiments, A-Array 416 is a sparse array containing N dispersed operands. In some embodiments, B-Array 414 is a contiguous array containing N contiguous indices. As shown, IMF instruction 401 includes fields to specify an opcode (DO-IMF) 402, a base address of the A-Array, AAddr 404, an element-size of the A-Array, ASize 406, a base address of the B-Array, BAddr 408, an element size of the B-Array, BSize 410, and a number of operands, N 412 (i.e., 3).

Here, the operand array (A-Array 416) is a sparse array logically having 64 elements, arranged in an 8-row by 8-column matrix, and only contains three operands (so, N=3).

In this embodiment, the N indices in the index array (B-Array 414) specify an address of each of the N operands in the operand array (A-Array 416). For example, the first index 418 in the B-Array identifies an address of a first operand at offset.

In operation, as shown here and as further described and illustrated with respect to FIGS. 2-3, and 5-6, a processing engine associated with IMF unit 400 is to fetch, using fetch circuitry, and decode, using decode circuitry, IMF instruction 401 having fields to specify a sparse operand array (e.g., A-Array, specified by AAddr 404 and ASize 406) containing N 412 dispersed operands, and a contiguous index array (e.g., B-Array, specified by BAddr 408 and BSize 410) containing N contiguous indices. Being contiguous, as used here, means the indices of the B-Array 414 are stored at contiguous locations, such as contiguous memory locations. The processing engine is to respond to the decoded IMF instruction by initializing IMF unit 400 to fetch, in order, the N operands, probing the IMF unit to determine readiness of one or more of the N operands, fetching the one or more of the N fetched operands from IMF unit 400, and repeating the probing and fetching until all N operands have been fetched from IMF unit 400.

For its part, once initialized by the processing engine, IMF unit 400, is to fetch one or more of the N contiguous indices (from B-Array 414, which is located at address BAddr 408, with each index having a size specified by BSize 410), then use the one or more fetched indices to fetch one or more corresponding operands of the N operands (from the A-Array 416, which is logically an 8×8 matrix located at address AAddr 404 and having three dispersed operands at Operand 1, 2, and 3 addresses 418, 420, and 422) by issuing N read requests, two or more at a time (up to X read requests at a time, depending on how may PTR registers, PTR0-PTRX, are available), to N addresses specified by the indices in B-Array 414, and provide the N operands in response to fetch requests from the processing engine. Note that the IMF unit 400 is to begin fetching operands from memory as soon as the first of the N indices is fetched from the index Array. In other words, according to some embodiments, the IMF unit 400 issues read requests to read operands while less than all of the N indices of the index array haven been loaded.

In this embodiment, AAddr 404 and ASize 406 are not used because the indices in B-Array 414 provide the locations of the operands. As such, in some embodiments, AAddr 404 of 7IMF instruction 401 is set to zero (0), which alerts the IMF control circuit (such as IMF control circuit 224 of FIG. 2) that B-Array 414 specifies operand locations, not offsets (as in FIG. 3).

Figure 5:
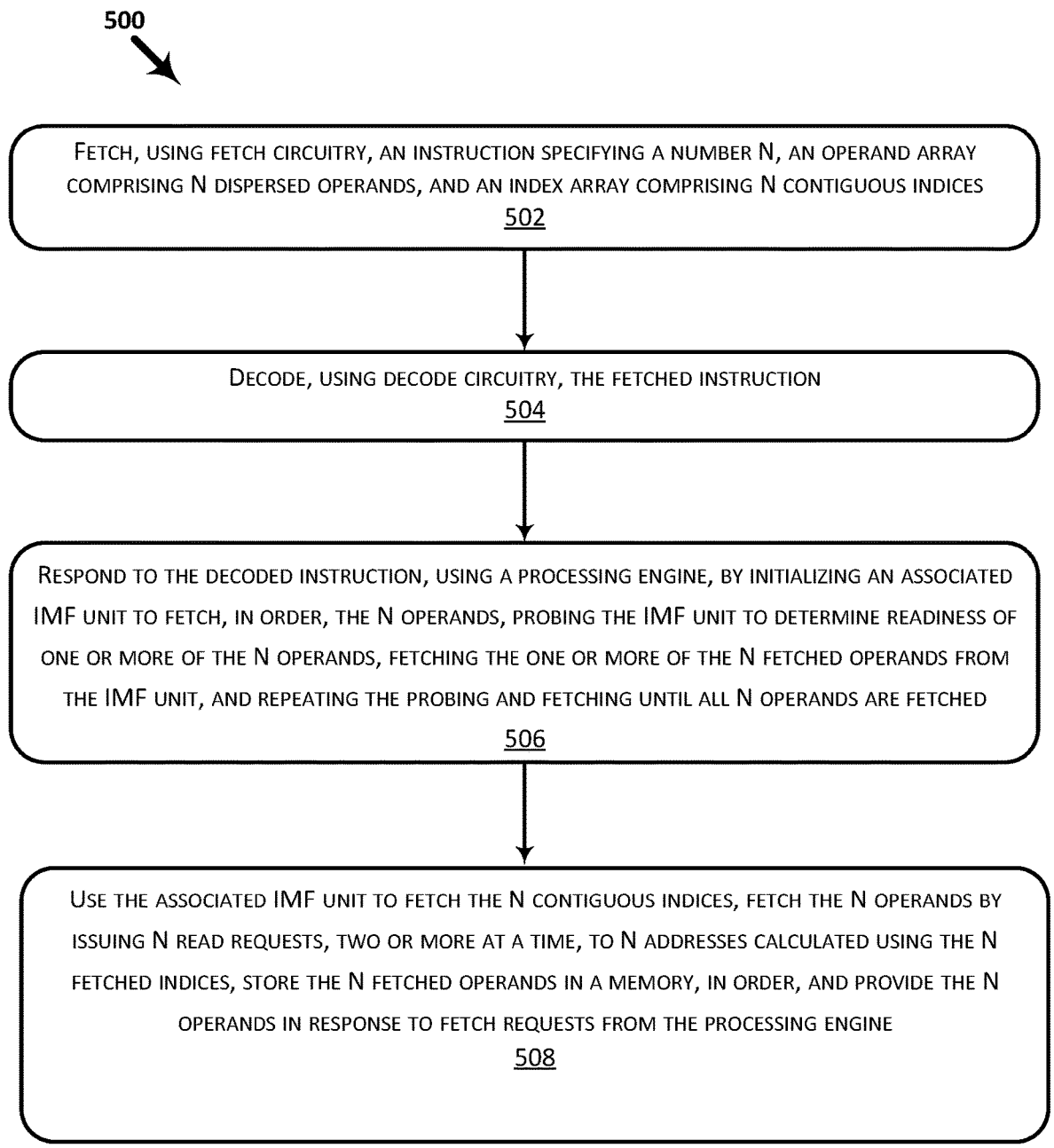
FIG. 5 is a block flow diagram illustrating a computing apparatus executing an indirect memory fetch (IMF) instruction, according to some embodiments.

FIG. 5 is a block flow diagram illustrating a computing apparatus executing an indirect memory fetch (IMF) instruction, according to some embodiments. As shown, a computing apparatus (which can be any of a processor multiprocessor, a processing core, an embedded processor, a cell processor, a virtual machine, and a thread of a multi-threaded processor) is to respond to an IMF instruction by executing flow 500. At 502, the computing apparatus is to fetch, using fetch circuitry, an instruction specifying a number N, an operand array containing N dispersed operands, and an index array containing N contiguous indices. At 504, the computing apparatus is to decode, using decode circuitry, the fetched instruction. At 506, the computing apparatus is to respond to the decoded IMF instruction, using a processing engine, by initializing an associated IMF unit to fetch, in order, the N operands, probing the IMF unit to determine readiness of one or more of the N operands, fetching the one or more of the N fetched operands from the IMF unit, and repeating the probing and fetching until all N operands are fetched. At 508, the processing engine is to use the associated IMF unit to fetch the N contiguous indices, fetch the N operands by issuing N read requests, two or more at a time, to N addresses calculated using the N fetched indices, store the N fetched operands in a memory, in order, and provide the N operands in response to fetch requests from the processing engine.

FIG. 6 is pseudocode illustrating a processing engine using an indirect memory fetch (IMF) unit, according to some embodiments. As shown, IMF instruction 601 includes fields to specify an opcode (DO-IMF) 602, a base address of the A-Array, AAddr 604, an element-size of the A-Array, ASize 606, a base address of the B-Array, BAddr 608, an element size of the B-Array, BSize 610, and a number of operands, N 612 (i.e., 3), In operation, according to some embodiments, all algorithms 620 are to operate in parallel.

Algorithm 621 describes an IMF unit loading indices from a contiguous index array (B-Array), according to some embodiments. As shown, next_free→address is the address field of the FIFO element pointed to by next_free. In operation, because the indices of B-Array are contiguous, the loads of the indices are similar to a normal load from a processing engine, i.e., through the cache hierarchy. These accesses are sequential and therefore benefit from caching and prefetching. As a result, the indices are expected to be loaded more quickly than the dispersed operands.

Algorithm 622 describes an IMF unit loading operands from a sparse operand array, A-Array. In some embodiments, the loads to the A-Array also check the cache hierarchy, to check for potential modified copies in one of the on-chip caches. If the data is cached somewhere on chip, it is retrieved from that source, rather than from memory. In some embodiments, the IMF unit avoids storing the fetched operands in a local cache in order to avoid cache pollution (the fetched operands are not expected to have temporal or spatial locality, or to be reused). If the data is not cached on chip, the IMF unit fetches the operand from main memory and also do not store it in any cache, because it will most likely have no locality. If the memory technology supports ASize byte-sized granularity, only ASize byte-sized loads are used, instead of loading full cache lines.

Algorithm 623 illustrates the IMF unit loading fetched operands when they arrive. Algorithm 624 illustrates the IMF unit responding to requests from the processing engine to fetch operands.

Coherence

In some embodiments, the data that is fetched by the IMF unit is cacheable and can be modified by other cores, meaning that the data in the IMF unit is included in the coherence protocol. In operation, embodiments that support cacheable operands add the core ID to the sharers list in the tag directory for data that is loaded in the IMF unit FIFO. In such embodiments, invalidation requests from other cores are sent to the current core. If an invalidate request is received by a core, it is also sent to its IMF unit. The IMF unit checks the addresses in the elements between ready_head and next_free, and if there is a match, the element is invalidated, and the element is re-fetched using the address in the FIFO (by allocating a free PTR). If ready_tail is past the invalidated element, it is set to the invalidated element, to indicate that this element is not ready yet.

In some embodiments, stores to the A-Array are not cached, because they are not likely reused in the near future. It is up to the programmer/compiler to implement a non-temporal store when an element of A is written. The only addition that should be made to the coherence protocol is that upon a write, an invalidate message is also sent to the core's own IMF unit, potentially invalidating data in the FIFO.

More Efficient Coherence Alternative

Alternatively, some embodiments enforce coherence by making the operand array (A-Array) uncacheable, i.e., even a normal load to an element of the operand array is never be cached in any cache. In such embodiments, writes to the operand array are directly written in main memory. Because the operand array is usually a very large structure, this can be done by assigning a number of pages to the operand array and marking these pages as uncacheable. Because none of the caches can contain elements of the operand array, no coherence messages are required. Such embodiments also do not have to keep the addresses in the FIFO, only the data, and loads to the operand array can directly access main memory, without checking the cache hierarchy for dirty copies. This leads to a reduction in chip space and latency, given that most accesses to the operand array are cache misses anyway.

In this case, it is still possible that elements that are already fetched by an IMF unit and that are not yet accessed by the core, are in the meantime modified by another core. This violates strict coherency. However, for most applications, this is not a severe issue, as the order in which data is read and written within one iteration of the (graph) algorithm is in any case not deterministic when run on a multicore processor. Typically, a barrier is implemented after each iteration of the algorithm, making sure that all data is written before the start of the next iteration. The algorithm then continues until a convergence criterion is met.

Speculation and Out-of-Order Execution

In high-performance processor cores, especially out-of-order cores, instructions can be executed speculatively. This implies that they should be able to roll back when the speculation turns out to be wrong. The IMF unit should therefore not immediately pop the head of the FIFO queue when the instruction is still speculative (i.e., it is not yet committed). Therefore, some embodiments support speculative execution and include a fourth FIFO pointer, a speculative_head_pointer. When a processing engine provides a speculative_IMF_initialize instruction to the IMF, the IMF unit executes the instruction similarly to the IMF instruction illustrated and described with respect to FIGS. 2-6, by first loading N indices from a contiguous index array, determining N addresses for the N operands in the sparse operand array, then using two or more read requests at a time to load the N operands into the FIFO. But when the processing issues a speculative_fetch instruction to the IMF unit, the IMF unit increments the speculative_head_pointer, but only increments the ready_head_pointer and deallocates the associated FIFO entry when the processing engine issues a speculative_commit instruction to the IMF unit indicating that the instruction using the speculatively-fetched operand has been committed. When mis-speculation is detected, and a rollback is required, the ready_head pointer is copied to the speculative_head_pointer, and the IMF unit resumes fetching from the element after the last committed element.

Context Switches

Upon a context switch, part of the IMF unit status should be saved because the application assumes that data is available in the IMF unit when it resumes. Some embodiments, limit the amount of data to be saved and limit the extra overhead, by only storing the state registers (AAddr, BAddr, ASize, BSize, and N) apart of the existing xsave procedure, and resume fetching from the indirect memory stream when the application is scheduled in again (on a xrestore).

When an application that has an active IMF unit is scheduled out, the state registers are changed such that they reflect the current architectural state (i.e., the state after the last committed instruction). In some embodiments the IMF unit maintains a number P of operands that have been fetched but not yet committed by subtracting ready_head from next_free, and add this result to the number N of operands left to fetch. That way, when the application is scheduled back in, the IMF unit will know that N+P operands are still to be fetched. The P elements that were fetched but not yet committed before the context switch are to be fetched again. In some embodiments, the IMF unit saves the P operands that had been fetched before the context switch, so that they need not be fetched again when the application switches back in.

Exceptions

When an arithmetic or memory address exception occurs in the IMF unit on loading from the A or B-Array, e.g., a segmentation fault, the exception is not immediately raised to the core, because this access could be never requested by the core, e.g., because an imf_cancel is executed before the data is fetched, or because the access could be speculative. Therefore, some embodiments store a special exception value in the FIFO element. When the element is fetched by the core, the exception is passed to the imf_fetch_next instruction, and it is only handled when the imf_fetch_next commits, similar to exceptions that occur on regular loads.

Vector Instructions

In a processor that supports vector instructions, indirect memory accesses could be implemented using vector gather instructions. These instructions fetch multiple elements of an array, indexed by the contents of a vector register, and put them in another vector register. This increases the number of memory operations issued by one instruction (and thus the memory level parallelism), and it also allows to process the fetched data using vector operations. To support vector instructions, a vector version of the imf_fetch_next instruction could be implemented, which fetches the first v (vector size) elements of the FIFO and sends them to the core in vector format. The instruction blocks if there are fewer than v elements in the FIFO (i.e., ready_tail−ready_head<v). Alternatively, this could be implemented by issuing v (scalar) imf_fetch_next instructions and arranging their data in a vector register.

Multiple IMF Units

Some embodiments add one IMF unit per hardware thread, such that each running thread has at least one IMF unit to its disposal. Some applications can have multiple indirect memory streams in the same loop. For correct execution, an ID field should be added to the initialization and fetch routines, such that the correct IMF unit is accessed. This ID field should also be added to the IMF units themselves. Alternatively, if only one thread is running on a multithreaded core, it could use the IMF units of the other threads. Therefore, it could be beneficial to implement multiple IMF units per hardware thread.

Format of the Indirect Memory Fetch Instruction

Figure 7:
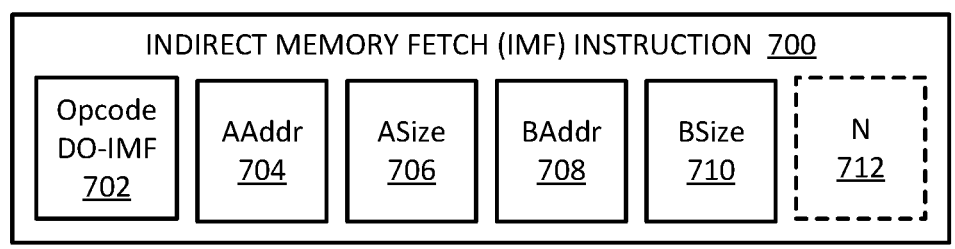
FIG. 7 is a block diagram illustrating a format for indirect memory fetch (IMF) instructions, according to some embodiments.

FIG. 7 is a block diagram illustrating a format for indirect memory fetch (IMF) instructions, according to some embodiments. As shown, IMF instruction 700 includes opcode 702 (here, DO-IMF), an address and an element size of an operand array (AAddr 704 and ASize 706), an address and an element size of an index array (BAddr 708 and BSize 710), and a number of operands, N 712. N 712 is optional, as indicated by its dashed border, insofar as the number of operands may be specified as part of the opcode 702, or when the operands have a predetermined size.

In operation, in some embodiments, IMF instruction 700 is to be fetched by a computing apparatus from a storage, and then used with an associated processing engine. In other embodiments, IMF instruction 700 is generated as one of several micro-instructions by decode circuitry of the computing apparatus.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 8A:
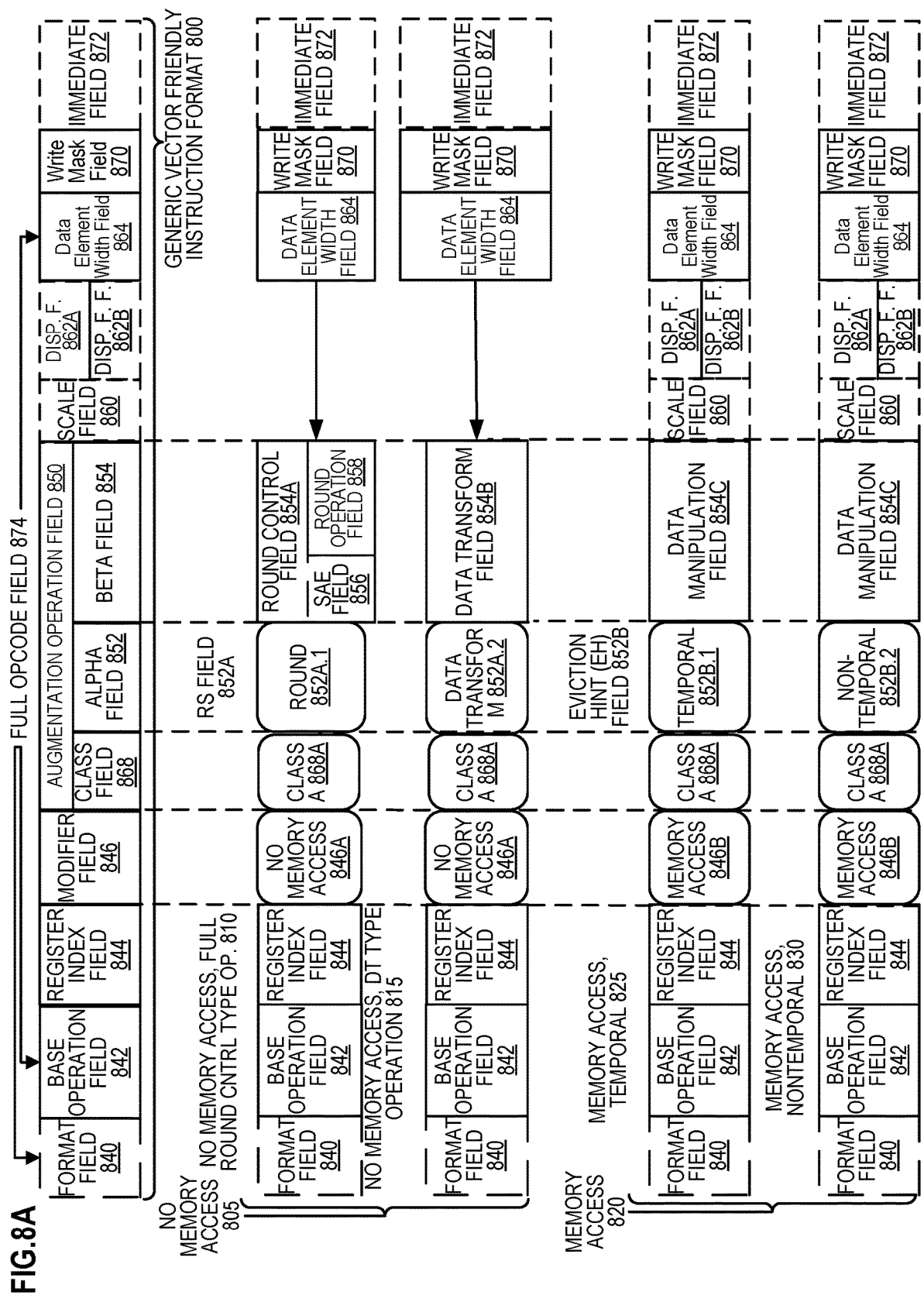
FIGS. 8A-8B are block diagrams illustrating a generic vector friendly instruction format and instruction templates thereof according to embodiments of the invention.
Figure 8B:
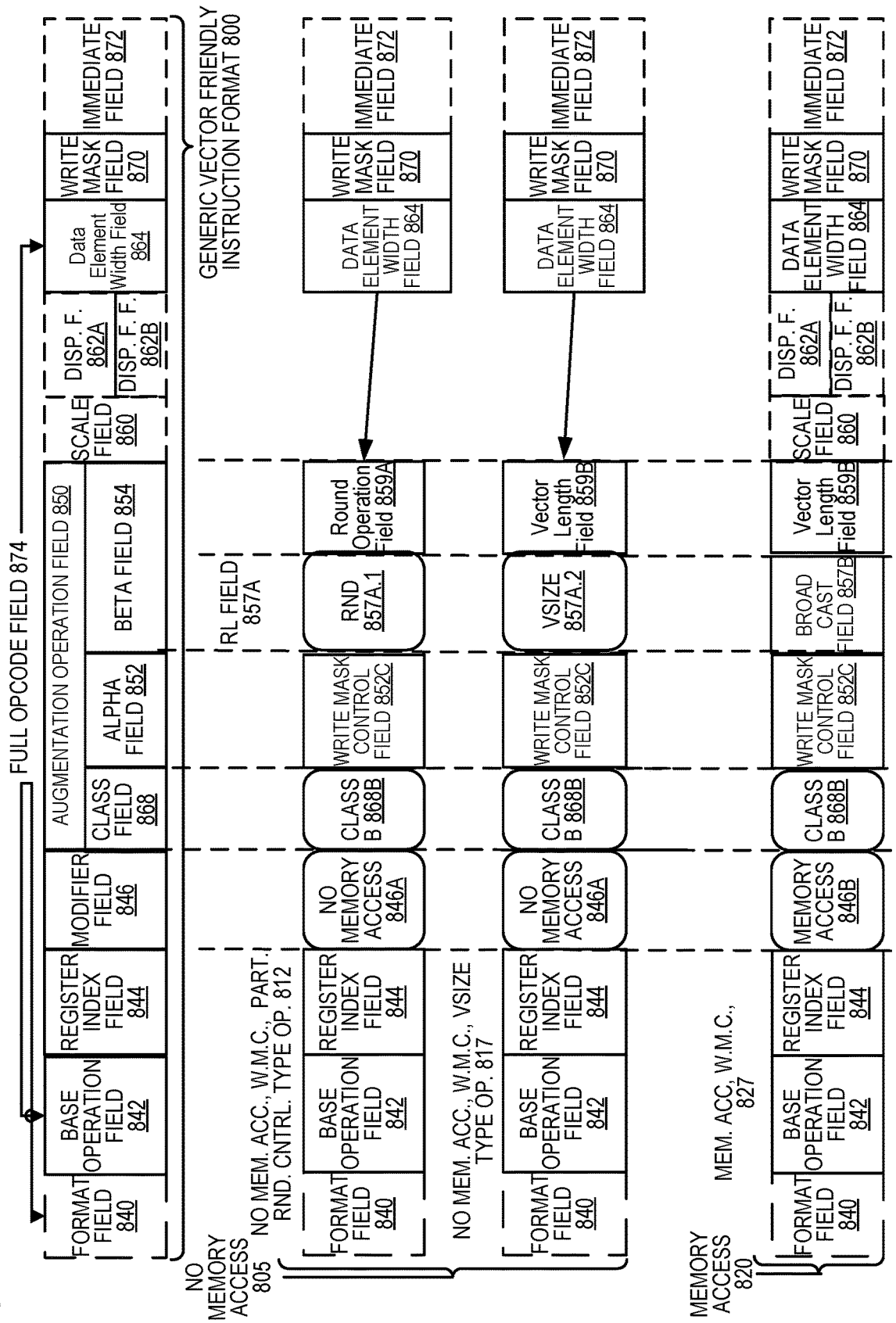

FIGS. 8A-8B are block diagrams illustrating a generic vector friendly instruction format and instruction templates thereof according to embodiments of the invention. FIG. 8A is a block diagram illustrating a generic vector friendly instruction format and class A instruction templates thereof according to embodiments of the invention; while FIG. 8B is a block diagram illustrating the generic vector friendly instruction format and class B instruction templates thereof according to embodiments of the invention. Specifically, a generic vector friendly instruction format 800 for which are defined class A and class B instruction templates, both of which include no memory access 805 instruction templates and memory access 820 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 8A include: 1) within the no memory access 805 instruction templates there is shown a no memory access, full round control type operation 810 instruction template and a no memory access, data transform type operation 815 instruction template; and 2) within the memory access 820 instruction templates there is shown a memory access, temporal 825 instruction template and a memory access, non-temporal 830 instruction template. The class B instruction templates in FIG. 8B include: 1) within the no memory access 805 instruction templates there is shown a no memory access, write mask control, partial round control type operation 812 instruction template and a no memory access, write mask control, vsize type operation 817 instruction template; and 2) within the memory access 820 instruction templates there is shown a memory access, write mask control 827 instruction template.

The generic vector friendly instruction format 800 includes the following fields listed below in the order illustrated in FIGS. 8A-8B.

Format field 840—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 842—its content distinguishes different base operations.

Register index field 844—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 846—its content distinguishes occurrences of instructions in the generic vector instruction format that specify memory access from those that do not; that is, between no memory access 805 instruction templates and memory access 820 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 850—its content distinguishes which one of a variety of different operations to be performed in addition to the base operation. This field is context specific. In one embodiment of the invention, this field is divided into a class field 868, an alpha field 852, and a beta field 854. The augmentation operation field 850 allows common groups of operations to be performed in a single instruction rather than 2, 3, or 4 instructions.

Scale field 860—its content allows for the scaling of the index field's content for memory address generation (e.g., for address generation that uses $2^{scale}*$index+base).

Displacement Field 862A—its content is used as part of memory address generation (e.g., for address generation that uses $2^{scale}*$index+base+displacement).

Displacement Factor Field 862B (note that the juxtaposition of displacement field 862A directly over displacement factor field 862B indicates one or the other is used)—its content is used as part of address generation; it specifies a displacement factor that is to be scaled by the size of a memory access (N)—where N is the number of bytes in the memory access (e.g., for address generation that uses $2^{scale}*$index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 874 (described later herein) and the data manipulation field 854C. The displacement field 862A and the displacement factor field 862B are optional in the sense that they are not used for the no memory access 805 instruction templates and/or different embodiments may implement only one or none of the two.

Data element width field 864—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 870—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 870 allows for partial vector operations, including loads, stores, arithmetic, logical, etc. While embodiments of the invention are described in which the write mask field's 870 content selects one of a number of write mask registers that contains the write mask to be used (and thus the write mask field's 870 content indirectly identifies that masking to be performed), alternative embodiments instead or additional allow the mask write field's 870 content to directly specify the masking to be performed.

Immediate field 872—its content allows for the specification of an immediate. This field is optional in the sense that is it not present in an implementation of the generic vector friendly format that does not support immediate and it is not present in instructions that do not use an immediate.

Class field 868—its content distinguishes between different classes of instructions. With reference to FIGS. 8A-B, the contents of this field select between class A and class B instructions. In FIGS. 8A-B, rounded corner squares are used to indicate a specific value is present in a field (e.g., class A 868A and class B 868B for the class field 868 respectively in FIGS. 8A-B).

Instruction Templates of Class A

In the case of the non-memory access 805 instruction templates of class A, the alpha field 852 is interpreted as an RS field 852A, whose content distinguishes which one of the different augmentation operation types are to be performed (e.g., round 852A.1 and data transform 852A.2 are respectively specified for the no memory access, round type operation 810 and the no memory access, data transform type operation 815 instruction templates), while the beta field 854 distinguishes which of the operations of the specified type is to be performed. In the no memory access 805 instruction templates, the scale field 860, the displacement field 862A, and the displacement scale filed 862B are not present.

No-Memory Access Instruction Templates—Full Round Control Type Operation

In the no memory access full round control type operation 810 instruction template, the beta field 854 is interpreted as a round control field 854A, whose content(s) provide static rounding. While in the described embodiments of the invention the round control field 854A includes a suppress all floating point exceptions (SAE) field 856 and a round operation control field 858, alternative embodiments may support may encode both these concepts into the same field or only have one or the other of these concepts/fields (e.g., may have only the round operation control field 858).

SAE field 856—its content distinguishes whether or not to disable the exception event reporting; when the SAE field's 856 content indicates suppression is enabled, a given instruction does not report any kind of floating-point exception flag and does not raise any floating point exception handler.

Round operation control field 858—its content distinguishes which one of a group of rounding operations to perform (e.g., Round-up, Round-down, Round-towards-zero and Round-to-nearest). Thus, the round operation control field 858 allows for the changing of the rounding mode on a per instruction basis. In one embodiment of the invention where a processor includes a control register for specifying rounding modes, the round operation control field's 850 content overrides that register value.

No Memory Access Instruction Templates—Data Transform Type Operation

In the no memory access data transform type operation 815 instruction template, the beta field 854 is interpreted as a data transform field 854B, whose content distinguishes which one of a number of data transforms is to be performed (e.g., no data transform, swizzle, broadcast).

In the case of a memory access 820 instruction template of class A, the alpha field 852 is interpreted as an eviction hint field 852B, whose content distinguishes which one of the eviction hints is to be used (in FIG. 8A, temporal 852B.1 and non-temporal 852B.2 are respectively specified for the memory access, temporal 825 instruction template and the memory access, non-temporal 830 instruction template), while the beta field 854 is interpreted as a data manipulation field 854C, whose content distinguishes which one of a number of data manipulation operations (also known as primitives) is to be performed (e.g., no manipulation; broadcast; up conversion of a source; and down conversion of a destination). The memory access 820 instruction templates include the scale field 860, and optionally the displacement field 862A or the displacement scale field 862B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 852 is interpreted as a write mask control (Z) field 852C, whose content distinguishes whether the write masking controlled by the write mask field 870 should be a merging or a zeroing.

In the case of the non-memory access 805 instruction templates of class B, part of the beta field 854 is interpreted as an RL field 857A, whose content distinguishes which one of the different augmentation operation types are to be performed (e.g., round 857A.1 and vector length (VSIZE) 857A.2 are respectively specified for the no memory access, write mask control, partial round control type operation 812 instruction template and the no memory access, write mask control, VSIZE type operation 817 instruction template), while the rest of the beta field 854 distinguishes which of the operations of the specified type is to be performed. In the no memory access 805 instruction templates, the scale field 860, the displacement field 862A, and the displacement scale filed 862B are not present.

In the no memory access, write mask control, partial round control type operation 810 instruction template, the rest of the beta field 854 is interpreted as a round operation field 859A and exception event reporting is disabled (a given instruction does not report any kind of floating-point exception flag and does not raise any floating point exception handler).

Round operation control field 859A—just as round operation control field 858, its content distinguishes which one of a group of rounding operations to perform (e.g., Round-up, Round-down, Round-towards-zero and Round-to-nearest). Thus, the round operation control field 859A allows for the changing of the rounding mode on a per instruction basis. In one embodiment of the invention where a processor includes a control register for specifying rounding modes, the round operation control field's 850 content overrides that register value.

In the no memory access, write mask control, VSIZE type operation 817 instruction template, the rest of the beta field 854 is interpreted as a vector length field 859B, whose content distinguishes which one of a number of data vector lengths is to be performed on (e.g., 128, 256, or 512 byte).

In the case of a memory access 820 instruction template of class B, part of the beta field 854 is interpreted as a broadcast field 857B, whose content distinguishes whether or not the broadcast type data manipulation operation is to be performed, while the rest of the beta field 854 is interpreted the vector length field 859B. The memory access 820 instruction templates include the scale field 860, and optionally the displacement field 862A or the displacement scale field 862B.

With regard to the generic vector friendly instruction format 800, a full opcode field 874 is shown including the format field 840, the base operation field 842, and the data element width field 864. While one embodiment is shown where the full opcode field 874 includes all of these fields, the full opcode field 874 includes less than all of these fields in embodiments that do not support all of them. The full opcode field 874 provides the operation code (opcode).

The augmentation operation field 850, the data element width field 864, and the write mask field 870 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 9A is a block diagram illustrating an exemplary specific vector friendly instruction format according to embodiments of the invention. FIG. 9A shows a specific vector friendly instruction format 900 that is specific in the sense that it specifies the location, size, interpretation, and order of the fields, as well as values for some of those fields. The specific vector friendly instruction format 900 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 8 into which the fields from FIG. 9A map are illustrated.

It should be understood that, although embodiments of the invention are described with reference to the specific vector friendly instruction format 900 in the context of the generic vector friendly instruction format 800 for illustrative purposes, the invention is not limited to the specific vector friendly instruction format 900 except where claimed. For example, the generic vector friendly instruction format 800 contemplates a variety of possible sizes for the various fields, while the specific vector friendly instruction format 900 is shown as having fields of specific sizes. By way of specific example, while the data element width field 864 is illustrated as a one bit field in the specific vector friendly instruction format 900, the invention is not so limited (that is, the generic vector friendly instruction format 800 contemplates other sizes of the data element width field 864).

The generic vector friendly instruction format 800 includes the following fields listed below in the order illustrated in FIG. 9A.

EVEX Prefix (Bytes 0-3) 902—is encoded in a four-byte form.

Format Field 840 (EVEX Byte 0, bits [7:0])—the first byte (EVEX Byte 0) is the format field 840 and it contains 0x62 (the unique value used for distinguishing the vector friendly instruction format in one embodiment of the invention).

The second-fourth bytes (EVEX Bytes 1-3) include a number of bit fields providing specific capability.

REX field 905 (EVEX Byte 1, bits [7-5])—consists of a EVEX.R bit field (EVEX Byte 1, bit [7]—R), EVEX.X bit field (EVEX byte 1, bit [6]—X), and 857BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' 910A—this is the first part of the REX' field 910 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 915 (EVEX byte 1, bits [3:0]—mmmm)—its content encodes an implied leading opcode byte (0F, 0F 38, or 0F 3).

Data element width field 864 (EVEX byte 2, bit [7]—W)—is represented by the notation EVEX.W. EVEX.W is used to define the granularity (size) of the datatype (either 32-bit data elements or 64-bit data elements).

EVEX.vvvv 920 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 920 encodes the 4 low-order bits of the first source register specifier stored in inverted (1s complement) form. Depending on the instruction, an extra different EVEX bit field is used to extend the specifier size to 32 registers.

EVEX.U 868 Class field (EVEX byte 2, bit [2]—U)—If EVEX.0=0, it indicates class A or EVEX.U0; if EVEX.0=1, it indicates class B or EVEX.U1.

Prefix encoding field 925 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 852 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 854 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' 910B—this is the remainder of the REX' field 910 and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 870 (EVEX byte 3, bits [2:0]—kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 930 (Byte 4) is also known as the opcode byte. Part of the opcode is specified in this field.

MOD R/M Field 940 (Byte 5) includes MOD field 942, Reg field 944, and R/M field 946. As previously described, the MOD field's 942 content distinguishes between memory access and non-memory access operations. The role of Reg field 944 can be summarized to two situations: encoding either the destination register operand or a source register operand or be treated as an opcode extension and not used to encode any instruction operand. The role of R/M field 946 may include the following: encoding the instruction operand that references a memory address or encoding either the destination register operand or a source register operand.

Scale, Index, Base (SIB) Byte (Byte 6)—As previously described, the scale field's 850 content is used for memory address generation. SIB.xxx 954 and SIB.bbb 956—the contents of these fields have been previously referred to with regard to the register indexes Xxxx and Bbbb.

Displacement field 862A (Bytes 7-10)—when MOD field 942 contains 10, bytes 7-10 are the displacement field 862A, and it works the same as the legacy 32-bit displacement (disp32) and works at byte granularity.

Displacement factor field 862B (Byte 7)—when MOD field 942 contains 01, byte 7 is the displacement factor field 862B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 862B is a reinterpretation of disp8; when using displacement factor field 862B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 862B substitutes the legacy x86 instruction set 8-bit displacement. Thus, the displacement factor field 862B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 872 operates as previously described.

Full Opcode Field

FIG. 9B is a block diagram illustrating the fields of the specific vector friendly instruction format 900 that make up the full opcode field 874 according to one embodiment of the invention. Specifically, the full opcode field 874 includes the format field 840, the base operation field 842, and the data element width (W) field 864. The base operation field 842 includes the prefix encoding field 925, the opcode map field 915, and the real opcode field 930.

Register Index Field

FIG. 9C is a block diagram illustrating the fields of the specific vector friendly instruction format 900 that make up the register index field 844 according to one embodiment of the invention. Specifically, the register index field 844 includes the REX field 905, the REX' field 910, the MODR/M.reg field 944, the MODR/M.r/m field 946, the VVVV field 920, xxx field 954, and the bbb field 956.

Augmentation Operation Field

Figure 9D:
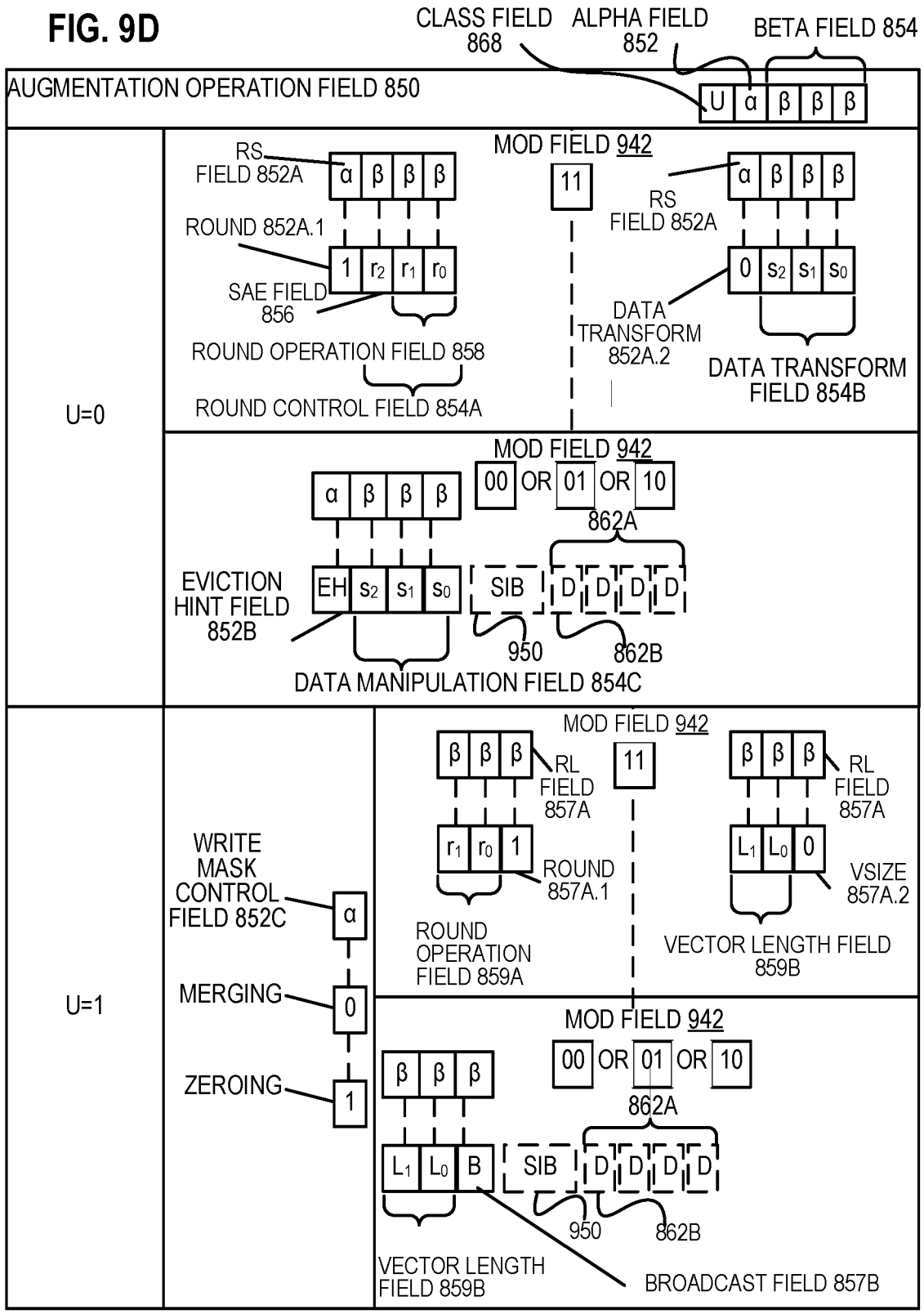
FIG. 9D is a block diagram illustrating the fields of the specific vector friendly instruction format that make up the augmentation operation field according to one embodiment of the invention.

FIG. 9D is a block diagram illustrating the fields of the specific vector friendly instruction format 900 that make up the augmentation operation field 850 according to one embodiment of the invention. When the class (U) field 868 contains 0, it signifies EVEX.U0 (class A 868A); when it contains 1, it signifies EVEX.U1 (class B 868B). When U=0 and the MOD field 942 contains 11 (signifying a no memory access operation), the alpha field 852 (EVEX byte 3, bit [7]—EH) is interpreted as the rs field 852A. When the rs field 852A contains a 1 (round 852A.1), the beta field 854 (EVEX byte 3, bits [6:4]—SSS) is interpreted as the round control field 854A. The round control field 854A includes a one bit SAE field 856 and a two bit round operation field 858. When the rs field 852A contains a 0 (data transform 852A.2), the beta field 854 (EVEX byte 3, bits [6:4]—SSS) is interpreted as a three bit data transform field 854B. When U=0 and the MOD field 942 contains 00, 01, or 10 (signifying a memory access operation), the alpha field 852 (EVEX byte 3, bit [7]—EH) is interpreted as the eviction hint (EH) field 852B and the beta field 854 (EVEX byte 3, bits [6:4]—SSS) is interpreted as a three bit data manipulation field 854C.

When U=1, the alpha field 852 (EVEX byte 3, bit [7]—EH) is interpreted as the write mask control (Z) field 852C. When U=1 and the MOD field 942 contains 11 (signifying a no memory access operation), part of the beta field 854 (EVEX byte 3, bit [4]—S$_0$) is interpreted as the RL field 857A; when it contains a 1 (round 857A.1) the rest of the beta field 854 (EVEX byte 3, bit [6-5]—S$_{2-1}$) is interpreted as the round operation field 859A, while when the RL field 857A contains a 0 (VSIZE 857.A2) the rest of the beta field 854 (EVEX byte 3, bit [6-5]—S$_{2-1}$) is interpreted as the vector length field 859B (EVEX byte 3, bit [6-5]—L$_{1-0}$). When U=1 and the MOD field 942 contains 00, 01, or 10 (signifying a memory access operation), the beta field 854 (EVEX byte 3, bits [6:4]—SSS) is interpreted as the vector length field 859B (EVEX byte 3, bit [6-5]—L$_{1-0}$) and the broadcast field 857B (EVEX byte 3, bit [4]—B).

Exemplary Register Architecture

Figure 10:
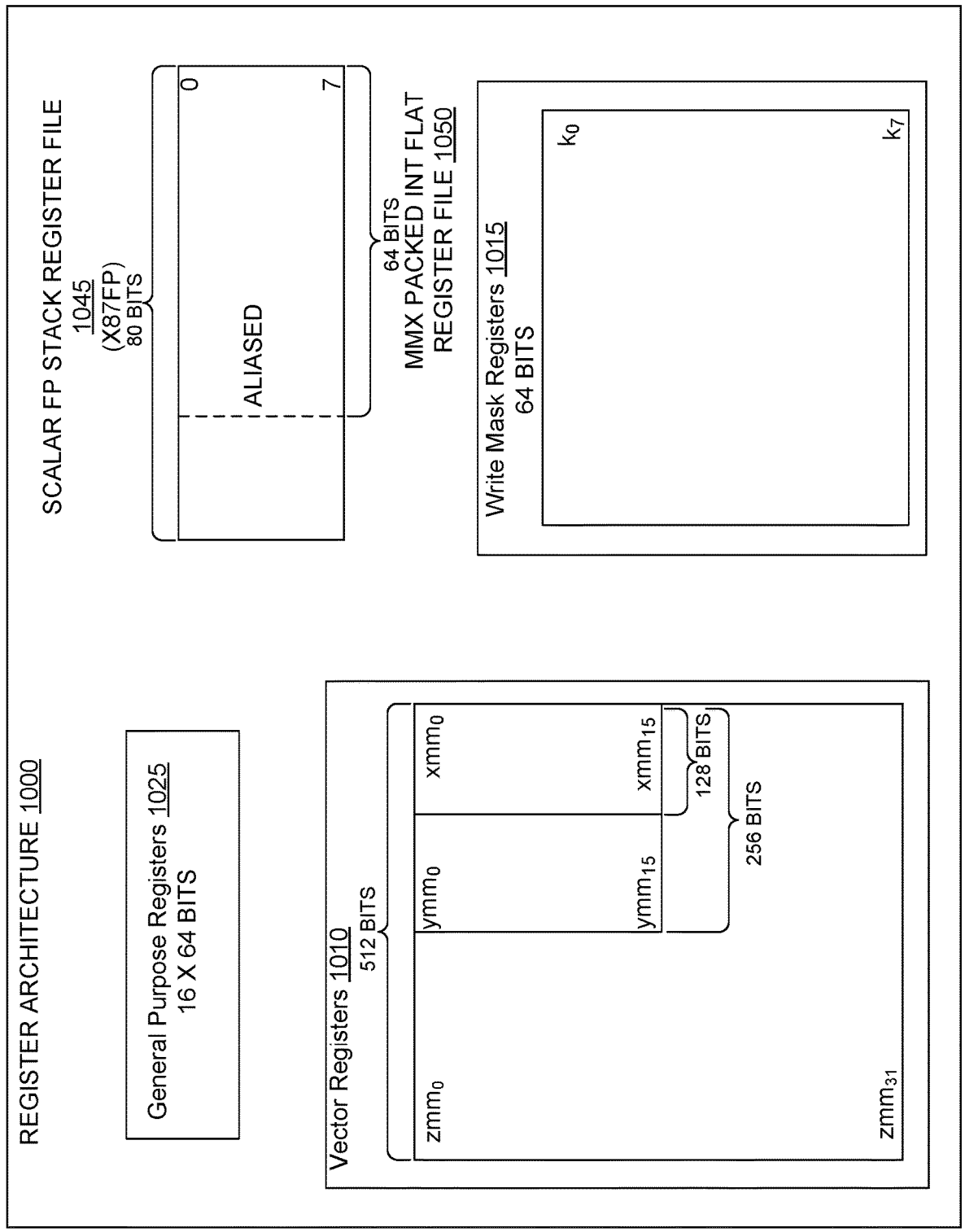
FIG. 10 is a block diagram of a register architecture according to one embodiment of the invention.

FIG. 10 is a block diagram of a register architecture 1000 according to one embodiment of the invention. In the embodiment illustrated, there are 32 vector registers 1010 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 900 operates on these overlaid register file as illustrated in the below tables.

| Adjustable Vector Length | Class | Operations | Registers |
|---|---|---|---|
| Instruction Templates that do not include the vector length field 859B | A (FIG. 8A; U = 0) | 810, 815, 825, 830 | zmm registers (the vector length is 64 byte) |
| | B (FIG. 8B; U = 1) | 812 | zmm registers (the vector length is 64 byte) |
| Instruction templates that do include the vector length field 859B | B (FIG. 8B; U = 1) | 817, 827 | zmm, ymm, or xmm registers (the vector length is 64 byte, 32 byte, or 16 byte) depending on the vector length field 859B |

In other words, the vector length field 859B selects between a maximum length and one or more other shorter lengths, where each such shorter length is half the length of the preceding length; and instructions templates without the vector length field 859B operate on the maximum vector length. Further, in one embodiment, the class B instruction templates of the specific vector friendly instruction format 900 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1015—in the embodiment illustrated, there are 8 write mask registers (k0 through k7), each 64 bits in size. In an alternate embodiment, the write mask registers 1015 are 16 bits in size. As previously described, in one embodiment of the invention, the vector mask register k0 cannot be used as a write mask; when the encoding that would normally indicate k0 is used for a write mask, it selects a hardwired write mask of 0x6F, effectively disabling write masking for that instruction.

General-purpose registers 1025—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1045, on which is aliased the MMX packed integer flat register file 1050—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 11A is a block diagram illustrating both an exemplary in-order pipeline and an exemplary register renaming, out-of-order issue/execution pipeline according to embodiments of the invention. FIG. 11B is a block diagram illustrating both an exemplary embodiment of an in-order architecture core and an exemplary register renaming, out-of-order issue/execution architecture core to be included in a processor according to embodiments of the invention. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetcher 1138, which is coupled to a decode unit 1140. The decode unit 1140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macroinstructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1158 comprises a vector registers unit, a write mask registers unit, and a scalar registers unit. These register units may provide architectural vector registers, vector mask registers, and general purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory.

By way of example, the exemplary register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 12B:
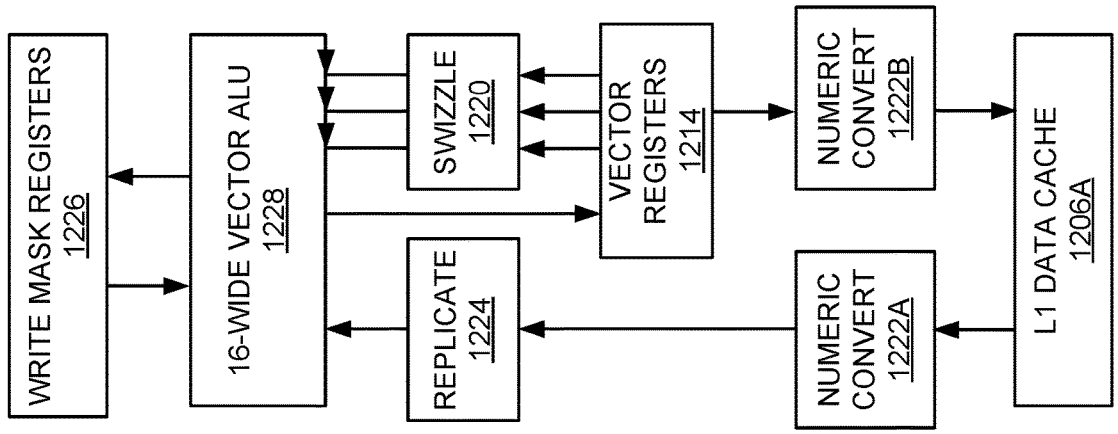
FIGS. 12A-B illustrate a block diagram of a more specific exemplary in-order core architecture, which core would be one of several logic blocks (including other cores of the same type and/or different types) in a chip.
Figure 12A:
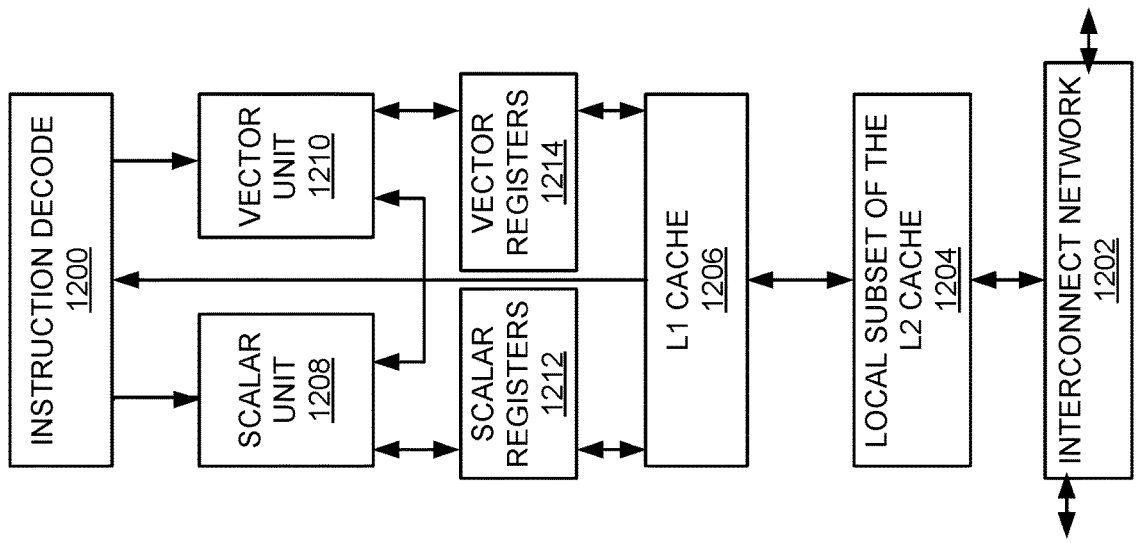

FIGS. 12A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 1202 and with its local subset of the Level 2 (L2) cache 1204, according to embodiments of the invention. In one embodiment, an instruction decoder 1200 supports the x86 instruction set with a packed data instruction set extension. An L1 cache 1206 allows low-latency accesses to cache memory into the scalar and vector units. While in one embodiment (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, alternative embodiments of the invention may use a different approach (e.g., use a single register set or include a communication path that allow data to be transferred between the two register files without being written and read back).

The local subset of the L2 cache 1204 is part of a global L2 cache that is divided into separate local subsets, one per processor core. Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to embodiments of the invention. FIG. 12B includes an L1 data cache 1206A part of the L1 cache 1204, as well as more detail regarding the vector unit 1210 and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input. Write mask registers 1226 allow predicating resulting vector writes.

Figure 13:
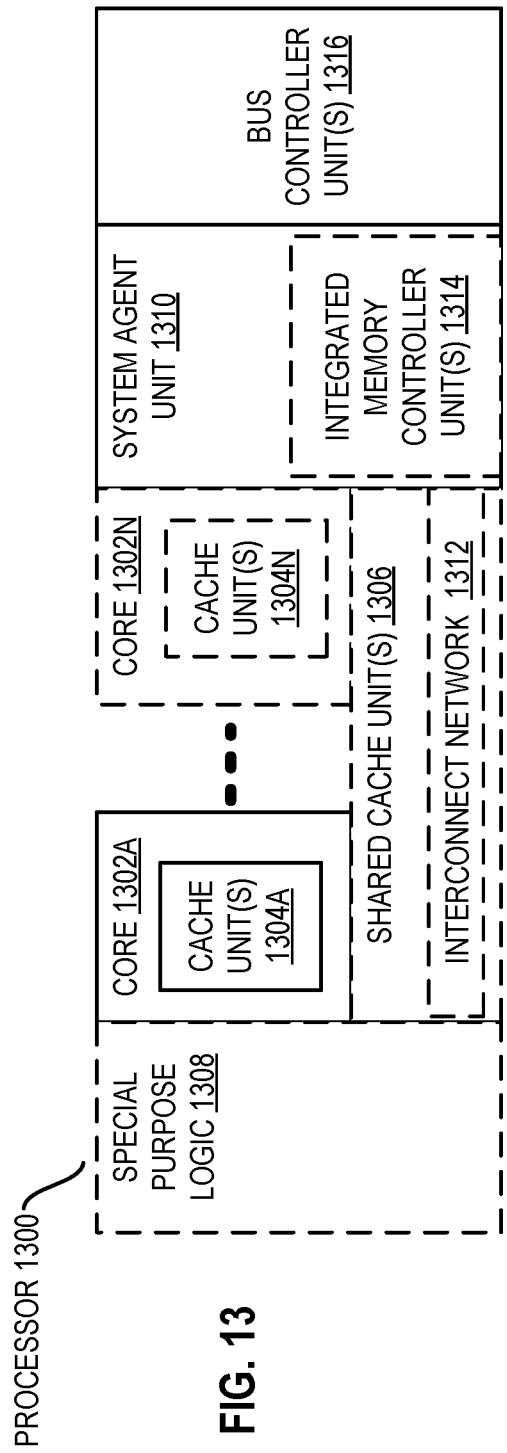
FIG. 13 is a block diagram of a processor that may have more than one core, may have an integrated memory controller, and may have integrated graphics according to embodiments of the invention.

FIG. 13 is a block diagram of a processor 1300 that may have more than one core, may have an integrated memory controller, and may have integrated graphics according to embodiments of the invention. The solid lined boxes in FIG. 13 illustrate a processor 1300 with a single core 1302A, a system agent 1310, a set of one or more bus controller units 1316, while the optional addition of the dashed lined boxes illustrates an alternative processor 1300 with multiple cores 1302A-N, a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment a ring based interconnect unit 1312 interconnects the integrated graphics logic 1308 (integrated graphics logic 1308 is an example of and is also referred to herein as special purpose logic), the set of shared cache units 1306, and the system agent unit 1310/integrated memory controller unit(s) 1314, alternative embodiments may use any number of well-known techniques for interconnecting such units. In one embodiment, coherency is maintained between one or more cache units 1306 and cores 1302-A-N.

In some embodiments, one or more of the cores 1302A-N are capable of multi-threading. The system agent 1310 includes those components coordinating and operating cores 1302A-N. The system agent unit 1310 may include for example a power control unit (PCU) and a display unit. The PCU may be or include logic and components needed for regulating the power state of the cores 1302A-N and the integrated graphics logic 1308. The display unit is for driving one or more externally connected displays.

The cores 1302A-N may be homogenous or heterogeneous in terms of architecture instruction set; that is, two or more of the cores 1302A-N may be capable of execution the same instruction set, while others may be capable of executing only a subset of that instruction set or a different instruction set.

Exemplary Computer Architectures

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
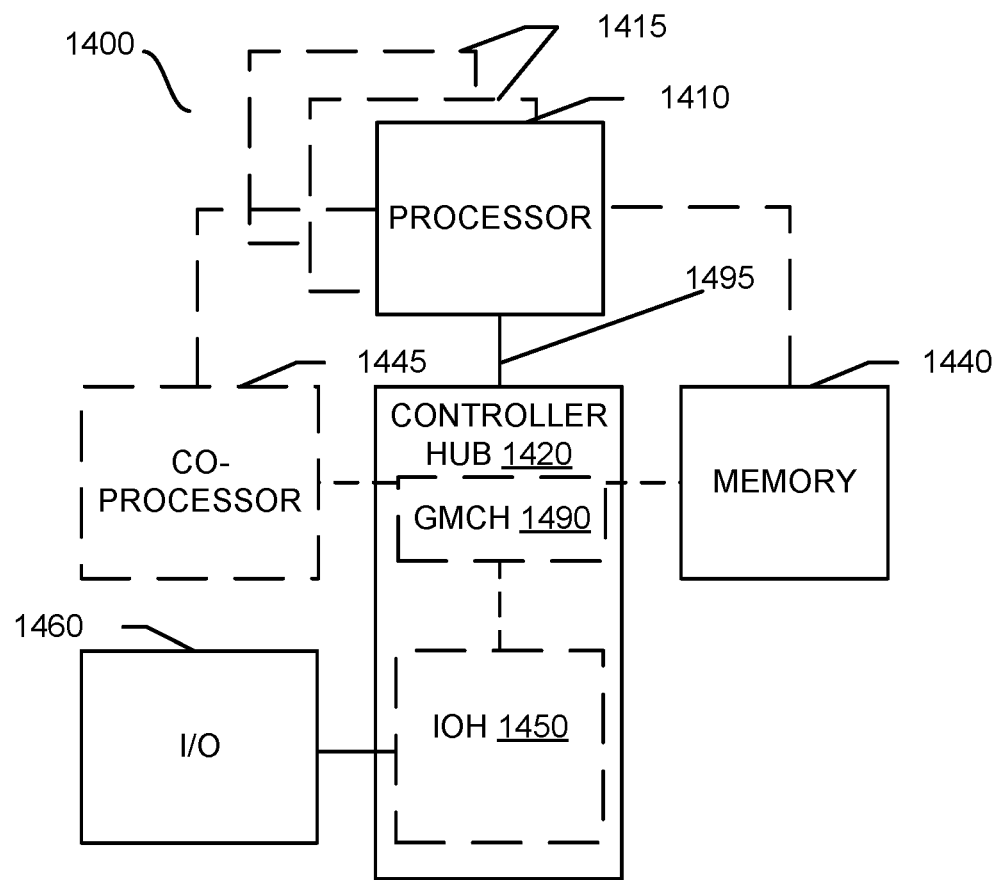
FIGS. 14-17 are block diagrams of exemplary computer architectures.

Referring now to FIG. 14, shown is a block diagram of a system 1400 in accordance with one embodiment of the present invention. The system 1400 may include one or more processors 1410, 1415, which are coupled to a controller hub 1420. In one embodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface such as QuickPath Interconnect (QPI), or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor(s) 1445 accept and execute the received coprocessor instructions.

Figure 15:
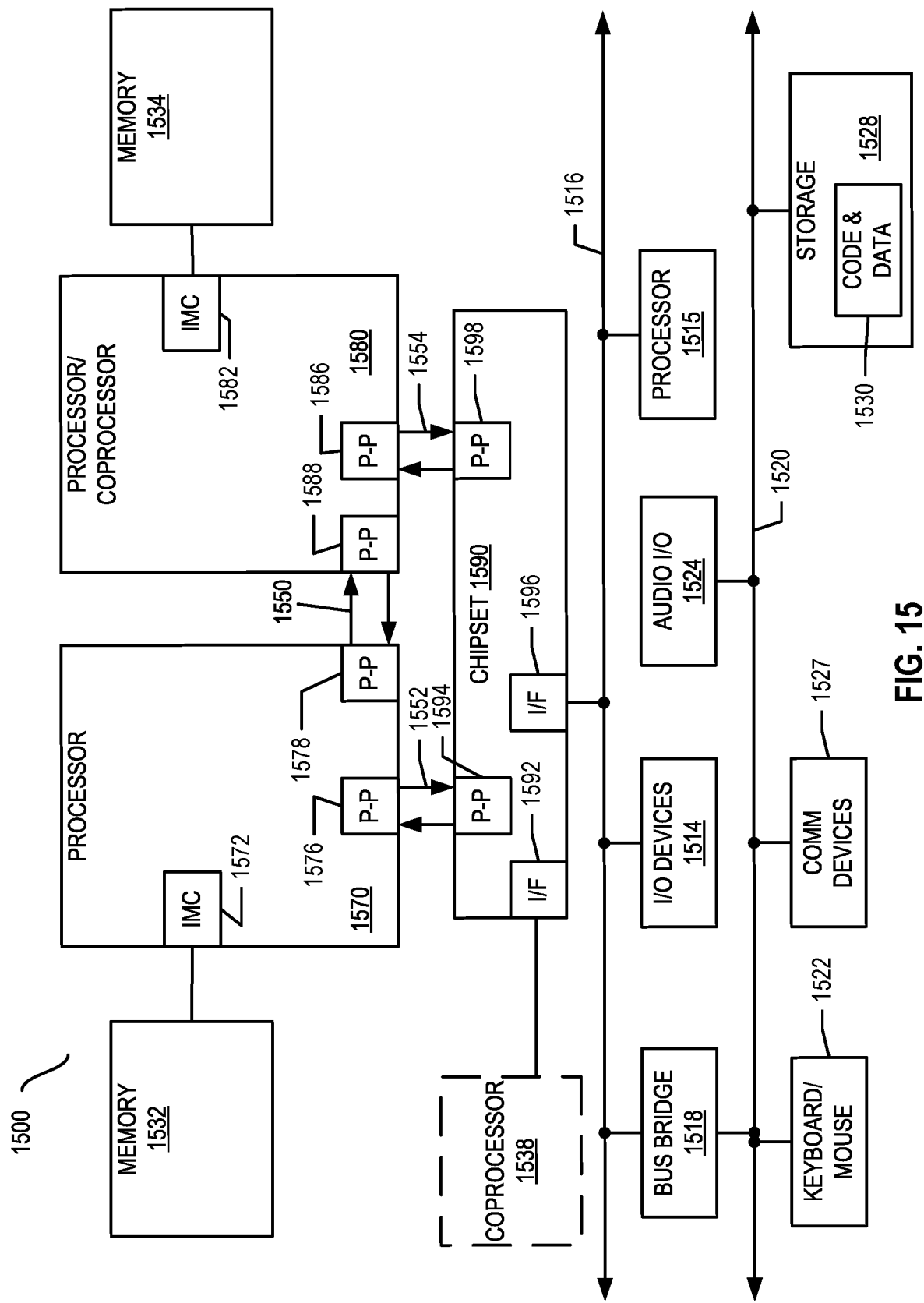

Referring now to FIG. 15, shown is a block diagram of a first more specific exemplary system 1500 in accordance with an embodiment of the present invention. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In one embodiment of the invention, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1592. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) units), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions/code and data 1530, in one embodiment. Further, an audio I/O 1524 may be coupled to the second bus 1520. Note that other architectures are possible. For example, instead of the point-to-point architecture of FIG. 15, a system may implement a multi-drop bus or other such architecture.

Figure 16:
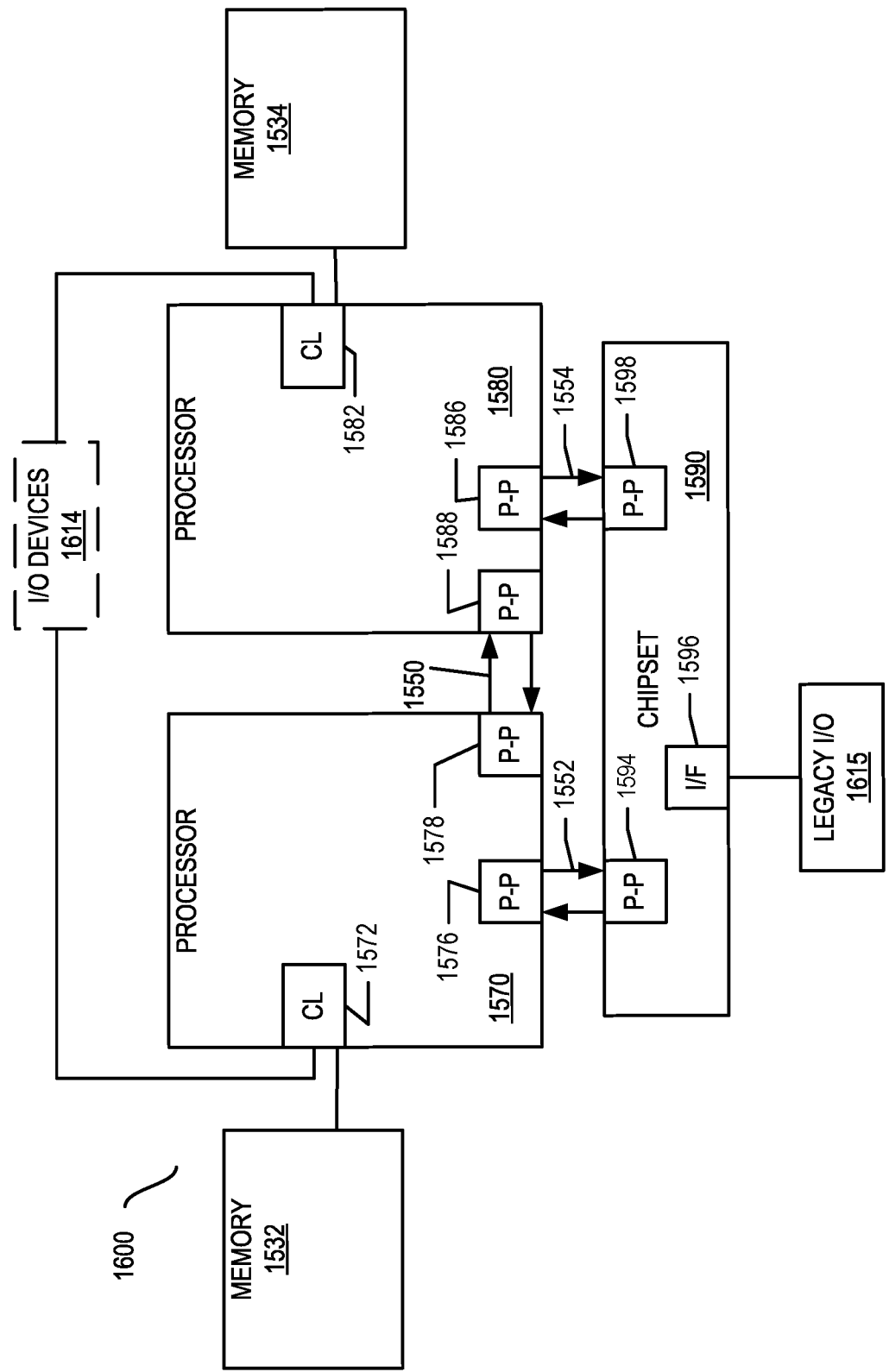

Referring now to FIG. 16, shown is a block diagram of a second more specific exemplary system 1600 in accordance with an embodiment of the present invention. Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller units and include I/O control logic. FIG. 16 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
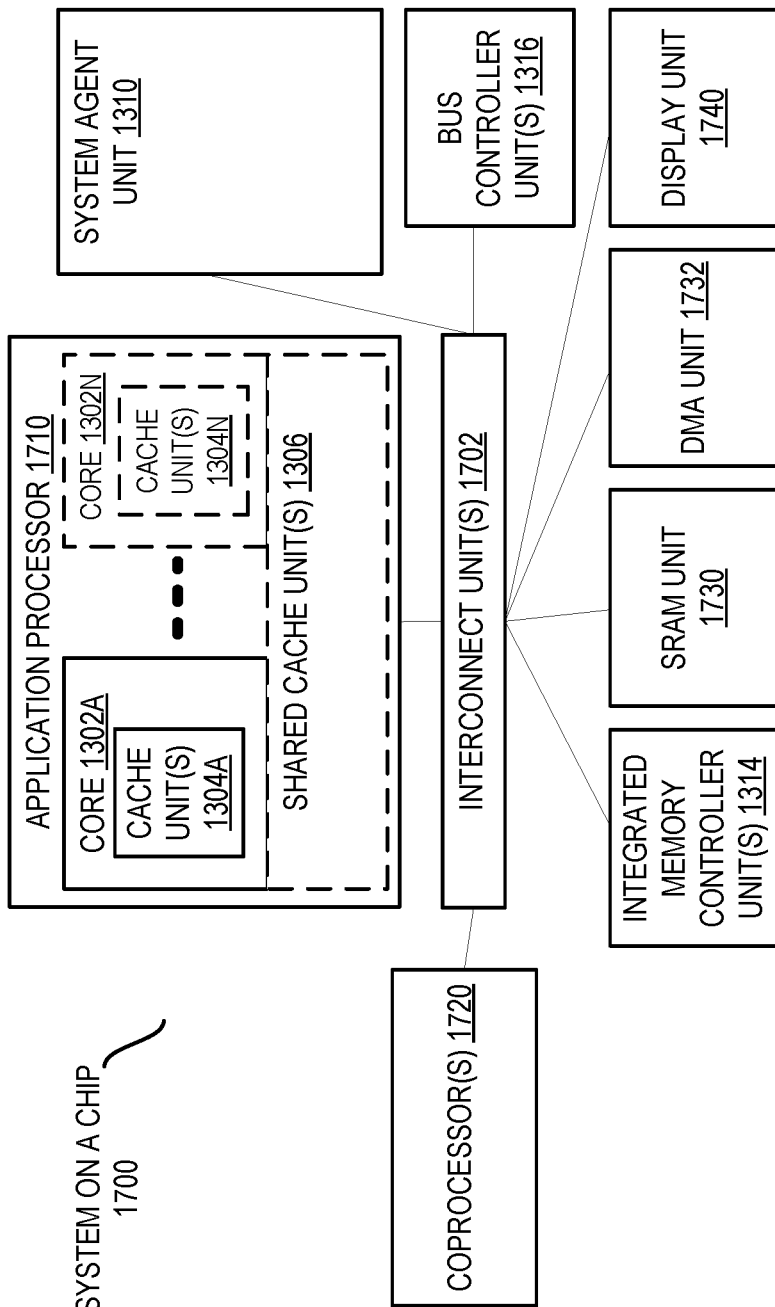

Referring now to FIG. 17, shown is a block diagram of a SoC 1700 in accordance with an embodiment of the present invention. Similar elements in FIG. 13 bear like reference numerals. Also, dashed lined boxes are optional features on more advanced SoCs. In FIG. 17, an interconnect unit(s) 1702 is coupled to: an application processor 1710 which includes a set of one or more cores 1302A-N, which include cache units 1304A-N, and shared cache unit(s) 1306; a system agent unit 1310; a bus controller unit(s) 1316; an integrated memory controller unit(s) 1314; a set or one or more coprocessors 1720 which may include integrated graphics logic, an image processor, an audio processor, and a video processor; an static random access memory (SRAM) unit 1730; a direct memory access (DMA) unit 1732; and a display unit 1740 for coupling to one or more external displays. In one embodiment, the coprocessor(s) 1720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, a non-transitory, computer-readable medium being an articles manufacture or being formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
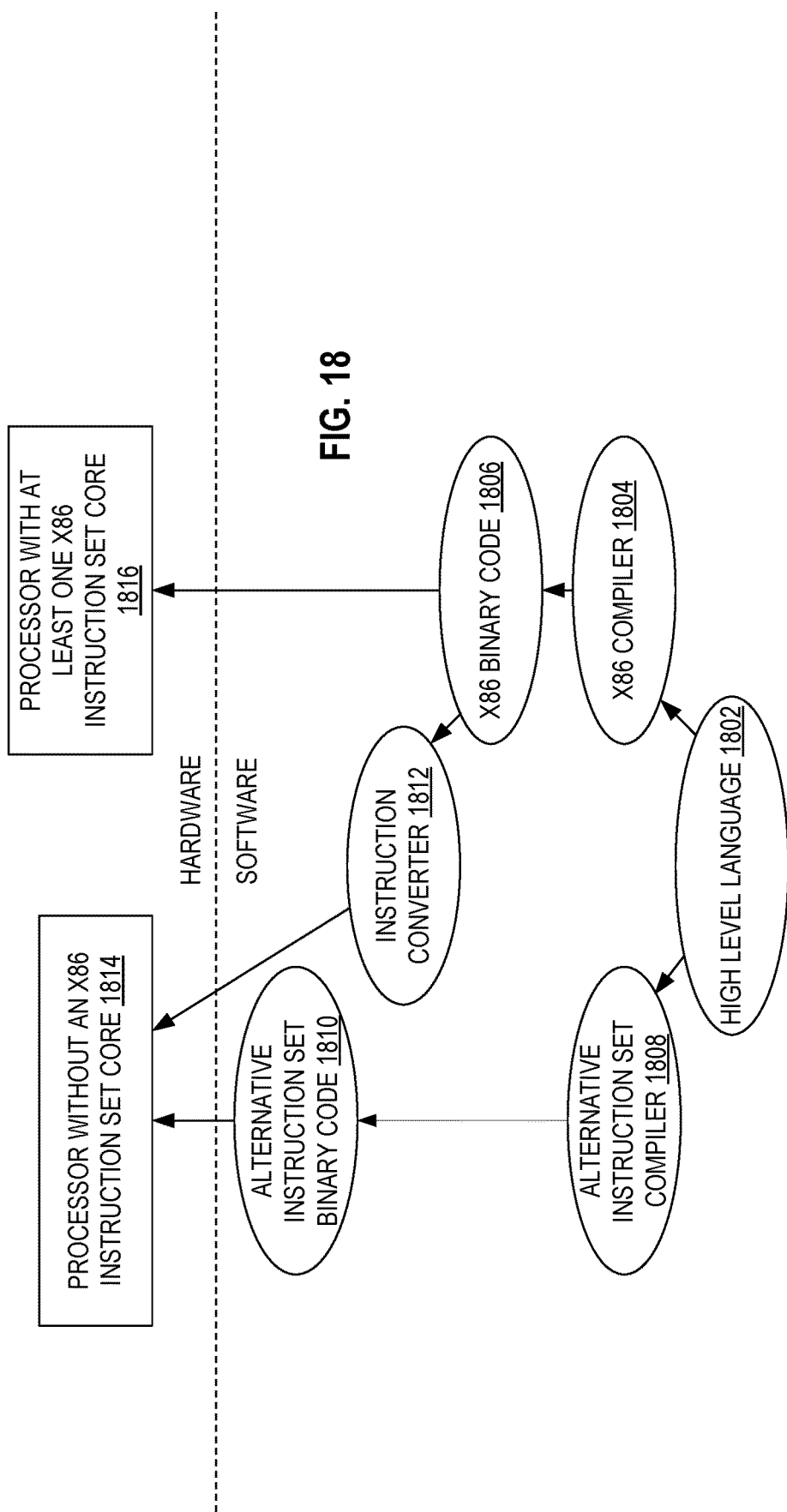
FIG. 18 is a block diagram contrasting the use of a software instruction converter to convert binary instructions in a source instruction set to binary instructions in a target instruction set according to embodiments of the invention.

FIG. 18 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

FURTHER EXAMPLES

Example 1 provides an exemplary apparatus comprising: a processing engine associated with an indirect memory fetch (IMF) unit; fetch circuitry to fetch an instruction having fields to specify a sparse operand array comprising N operands and a contiguous index array comprising N indices; and decode circuitry to decode the fetched instruction; wherein the processing engine is to respond to the decoded instruction by initializing the IMF unit to load, in order, the N operands, probing the IMF unit to determine readiness of one or more loaded operands, fetching the one or more loaded operands from the IMF unit, and repeating the probing and fetching until all N operands have been fetched; and wherein the IMF unit, once initialized, is to read the N indices from the contiguous index array, read the N operands from the sparse operand array by issuing N read requests, two or more at a time, to N addresses calculated using the N indices, store the N operands in a memory, in order, and provide the N operands in order in response to fetch requests from the processing engine.

Example 2 includes the substance of the exemplary apparatus of claim 1, wherein the instruction is to specify a base address and an element size of the sparse operand array, and wherein each index in the contiguous index array is to specify, for each of the N operands, an offset, in terms of a number of elements, from the base address.

Example 3 includes the substance of the exemplary apparatus of claim 1, wherein the instruction is further to specify an element size of each of the N operands, and wherein each index in the contiguous index array is to specify, for each of the N operands, a memory address where the operand comprising the element size is stored.

Example 4 includes the substance of the exemplary apparatus of claim 1, wherein the apparatus is one of a processor, a multiprocessor, a processing core, an embedded processor, a cell processor, a virtual machine, and a multi-threaded processor.

Example 5 includes the substance of the exemplary apparatus of claim 1, wherein the IMF unit is to include a first-in, first-out buffer (FIFO) in which to store, and from which to deliver, the fetched operands in order; wherein the IMF unit is to apply a coherence protocol to the fetched operands stored in the FIFO; and wherein the fetched operands are available to other processing engines of the apparatus.

Example 6 includes the substance of the exemplary apparatus of claim 1, wherein the apparatus is one of a multiprocessor, a multi-core processor, a multi-threaded processor, and wherein the apparatus further comprises one or more additional processing engines, each additional processing engine associated with an additional IMF unit.

Example 7 includes the substance of the exemplary apparatus of claim 1, wherein the IMF unit is to include a first-in, first-out buffer (FIFO) in which to store, and from which to deliver, the N operands; wherein the IMF unit further comprises state registers to store an IMF state comprising a first base address and a first element size of the operand array, a second base address and a second element size of the index array, a number of operands (N) to fetch, and a pending transaction register for each of the two or more issued read requests, the pending transaction register to include an address associated with each read request, and a pointer to a FIFO location in which to store each of the N operands; and wherein the IMF unit is to save the IMF state before a context switch, and to either resume or restart the decoded instruction upon returning from the context switch.

Example 8 includes the substance of the exemplary apparatus of claim 1, wherein the IMF unit, when any of the two or more read requests encounters an arithmetic exception, is to not immediately raise an exception flag, and instead to inform the processing engine of the arithmetic exception when the processing engine in response to a request to fetch the operand.

Example 9 includes the substance of the exemplary apparatus of claim 1, wherein the IMF unit includes a first-in, first-out buffer (FIFO) in which to store the fetched operands, and further includes a ready_head pointer to point to a next element to send to the processing engine, a ready_tail pointer to point to an element after the last valid element, and a next_free pointer to point to the next element of the FIFO that can be allocated for a new element fetched from the operand array.

Example 10 includes the substance of the exemplary apparatus of claim 9, wherein the IMF unit is further to advance a speculative-head-pointer of an operand that is retrieved by the processing engine, and to advance the head pointer once an associated instruction has been committed.

Example 11 provides an exemplary method to be executed by a computing apparatus, the method comprising: fetching, using fetch circuitry, an instruction with fields to specify a number N, a sparse operand array comprising N operands, and a contiguous index array comprising N indices; decoding, using decode circuitry, the fetched instruction; responding to the decoded instruction, using a processing engine associated with an indirect memory fetch (IMF) unit, by initializing the IMF unit to load, in order, the N operands, probing the IMF unit to determine readiness of one or more loaded operands, fetching the one or more loaded operands from the IMF unit, and repeating the probing and fetching until all N operands have been fetched; and wherein the IMF unit, once initialized, is to read the N indices from the contiguous index array, read the N operands from the sparse operand array by issuing N read requests, two or more at a time, to N addresses calculated using the N indices, store the N read operands in a memory, in order, and provide the N operands in order in response to fetch requests from the processing engine.

Example 12 includes the substance of the exemplary method of claim 11, wherein the computing apparatus comprises one of a multiprocessor, a processing core, an embedded processor, a cell processor, a virtual machine, and a multi-threaded processor.

Example 13 includes the substance of the exemplary method of claim 11, wherein the computing apparatus is further to comprise one or more additional processing engines, each associated with a unique IMF unit, the computing apparatus to further respond by fetching and decoding one or more additional instances of the instruction and using the one or more additional processing engines to respond to the one or more additional instances of the instruction.

Example 14 includes the substance of the exemplary method of claim 11, wherein the decoding is to use decode circuitry to generate, according to an instruction set architecture of the IMF unit, an initialize instruction, a probe instruction, and a fetch instruction to be used by the processing engine to perform the initializing, the probing, and the fetching.

Example 15 includes the substance of the exemplary method of claim 11, further comprising the computing apparatus fetching and decoding an initialize instruction, a probe instruction, and a fetch instruction, according to an instruction set architecture of the IMF unit, to be used by the processing engine to perform the initializing, the probing, and the fetching.

Example 16 includes the substance of the exemplary method of claim 11: wherein the IMF unit is to include a first-in, first-out buffer (FIFO) in which to store, and from which to deliver, the fetched operands in order; wherein the IMF unit is to apply a coherence protocol to the fetched operands stored in the FIFO; and wherein the fetched operands are available to other processing engines of the apparatus.

Example 17 includes the substance of the exemplary method of claim 11, wherein the IMF unit includes a first-in, first-out buffer (FIFO) in which to store the N operands; wherein the IMF unit comprises state registers to store an IMF state comprising a first base address and a first element size of the sparse operand array, a second base address and a second element size of the index array, a number of operands (N), and a memory fetch pointer for each of the two or more issued read requests, the memory fetch pointer to include an address associated with each read request, and a pointer to a FIFO location in which to store the N read operands when they arrive; and wherein the IMF unit is to save its IMF state before a context switch, and to either resume or restart the decoded instruction upon returning from the context switch.

Example 18 provides an exemplary non-transitory computer-readable medium containing instructions that, when read and decoded by a computing apparatus, cause the computing apparatus to respond by: fetching, using fetch circuitry, an instruction specifying a sparse operand array comprising N operands, and a contiguous index array comprising N indices; decoding, using decode circuitry, the fetched instruction; responding to the decoded instruction, using a processing engine associated with an indirect memory fetch (IMF) unit, by initializing the IMF unit to load, in order, the N operands, probing the IMF unit to determine readiness of one or more loaded operands, fetching the one or more loaded operands from the IMF unit, and repeating the probing and fetching until all N operands have been fetched; and wherein the IMF unit, once initialized, is to read the N indices from the contiguous index array, read the N operands from the sparse operand array by issuing N read requests, two or more at a time, to N addresses calculated using the N indices, store the N read operands in a memory, in order, and provide the N operands in order in response to fetch requests from the processing engine.

Example 19 includes the substance of the exemplary non-transitory computer-readable medium of claim 18, wherein the computing apparatus comprises one of a multiprocessor, a processing core, an embedded processor, a cell processor, a virtual machine, and a multi-threaded processor.

Example 20 includes the substance of the exemplary non-transitory computer-readable medium of claim 18, wherein the computing apparatus is further to comprise one or more additional processing engines, each associated with a unique IMF unit, the computing apparatus to further respond by fetching and decoding one or more additional instances of the instruction and using the one or more additional processing engines to respond to the one or more additional instances of the instruction.

What is claimed is:

1. An apparatus comprising:
   a processing engine associated with an indirect memory fetch (IMF) unit;
   fetch circuitry to fetch an instruction having fields to specify a sparse operand array comprising N operands and a contiguous index array comprising N indices; and
   decode circuitry to decode the fetched instruction;
   wherein the processing engine is to respond to the decoded instruction by initializing the IMF unit to load, in order, the N operands, probing the IMF unit to determine readiness of one or more loaded operands, fetching the one or more loaded operands from the IMF unit, and repeating the probing and fetching until all N operands have been fetched, and
   wherein the IMF unit is to read the N indices from the contiguous index array, read the N operands from the sparse operand array by issuing N read requests, two or more at a time, to N addresses calculated using the N indices, store the N operands in a memory, in order, and provide the N operands in order in response to fetch requests from the processing engine.

2. The apparatus of claim 1, wherein the instruction is to specify a base address and an element size of the sparse operand array, and wherein each index in the contiguous index array is to specify, for each of the N operands, an offset, in terms of a number of elements, from the base address.

3. The apparatus of claim 1, wherein the instruction is further to specify an element size of each of the N operands, and wherein each index in the contiguous index array is to specify, for each of the N operands, a memory address where the operand comprising the element size is stored.

4. The apparatus of claim 1, wherein the apparatus is one of a processor, a multiprocessor, a processing core, an embedded processor, or a multi-threaded processor.

5. The apparatus of claim 1, wherein the IMF unit is to include a first-in, first-out buffer (FIFO) in which to store, and from which to deliver, the fetched operands in order, wherein the IMF unit is to apply a coherence protocol to the fetched operands stored in the FIFO, and wherein the fetched operands are available to other processing engines of the apparatus.

6. The apparatus of claim 1, further comprising one or more additional processing engines, each additional processing engine associated with an additional IMF unit.

7. The apparatus of claim 1:
wherein the IMF unit is to include a first-in, first-out buffer (FIFO) in which to store, and from which to deliver, the N operands;
wherein the IMF unit further comprises state registers to store an IMF state comprising a first base address and a first element size of the operand array, a second base address and a second element size of the index array, a number of operands (N) to fetch, and a pending transaction register (PTR) for each of the read requests, the PTR to include an address associated with the read request, and a pointer to a FIFO location in which to store the fetched operand; and
wherein the IMF unit is to save the IMF state before a context switch, and to either resume or restart the decoded instruction upon returning from the context switch.

8. The apparatus of claim 1, wherein the IMF unit, when any of the read requests encounters an arithmetic or memory address exception, is to not immediately raise an exception flag, and instead to inform the processing engine of the arithmetic or memory address exception when the instruction commits.

9. The apparatus of claim 1, wherein the IMF unit includes a first-in, first-out buffer (FIFO) in which to store, and from which to deliver, the fetched operands, and further includes a ready_head pointer to point to a next element to send to the processing engine, a ready_tail pointer to point to an element after the last valid element, and a next_free pointer to point to the next element of the FIFO that can be allocated for a new element fetched from the operand array.

10. The apparatus of claim 9, wherein the IMF unit is further to advance a speculative-head-pointer of an operand that is retrieved by the processing engine, and to advance the head pointer once an associated instruction has been committed.

11. A method to be executed by a computing apparatus, the method comprising:

fetching, using fetch circuitry, an instruction with fields to specify a number N, a sparse operand array comprising N operands, and a contiguous index array comprising N indices;
decoding, using decode circuitry, the fetched instruction; and
responding to the decoded instruction, using a processing engine associated with an indirect memory fetch (IMF) unit, by initializing the IMF unit to load, in order, the N operands, probing the IMF unit to determine readiness of one or more loaded operands, fetching the one or more loaded operands from the IMF unit, and repeating the probing and fetching until all N operands have been fetched;
wherein the IMF unit, once initialized, is to read the N indices from the contiguous index array, read the N operands from the sparse operand array by issuing N read requests, two or more at a time, to N addresses calculated using the N indices, store the N read operands in a memory, in order, and provide the N operands in order in response to fetch requests from the processing engine.

12. The method of claim 11, wherein the computing apparatus comprises one or more of a multiprocessor, a processing core, an embedded processor, or a multi-threaded processor.

13. The method of claim 11, wherein the computing apparatus is further to comprise one or more additional processing engines, each associated with a unique IMF unit, the computing apparatus to further respond by fetching and decoding one or more additional instances of the instruction and using the one or more additional processing engines to respond to the one or more additional instances of the instruction.

14. The method of claim 11, wherein the decoding is to use decode circuitry to generate, according to an instruction set architecture of the IMF unit, an initialize instruction, a probe instruction, and a fetch instruction to be used by the processing engine to perform the initializing, the probing, and the fetching.

15. The method of claim 11, further comprising the computing apparatus fetching and decoding an initialize instruction, a probe instruction, and a fetch instruction, according to an instruction set architecture of the IMF unit, to be used by the processing engine to perform the initializing, the probing, and the fetching.

16. The method of claim 11:
wherein the IMF unit is to include a first-in, first-out buffer (FIFO) in which to store, and from which to deliver, the fetched operands in order;
wherein the IMF unit is to apply a coherence protocol to the fetched operands stored in the FIFO; and
wherein the fetched operands are available to other processing engines of the apparatus.

17. The method of claim 11,
wherein the IMF unit includes a first-in, first-out buffer (FIFO) in which to store, and from which to deliver, the N operands,
wherein the IMF unit comprises state registers to store an IMF state comprising a first base address and a first element size of the sparse operand array, a second base address and a second element size of the index array, a number of operands (N), and a pending transaction register (PTR) for each of the issued read requests, the PTR to include an address associated with each read request, and a pointer to a FIFO location in which to store the N read operands when they arrive, and wherein the IMF unit is to save its IMF state before a context switch, and to either resume or restart the decoded instruction upon returning from the context switch.

18. A non-transitory computer-readable medium containing instructions that, when read and decoded by a computing apparatus, cause the computing apparatus to respond by:
fetching, using fetch circuitry, an instruction specifying a sparse operand array comprising N operands, and a contiguous index array comprising N indices;
decoding, using decode circuitry, the fetched instruction; and
responding to the decoded instruction, using a processing engine associated with an indirect memory fetch (IMF) unit, by initializing the IMF unit to load, in order, the N operands, probing the IMF unit to determine readiness of one or more loaded operands, fetching the one or more loaded operands from the IMF unit, and repeating the probing and fetching until all N operands have been fetched; and
wherein the IMF unit, once initialized, is to read the N indices from the contiguous index array, read the N operands from the sparse operand array by issuing N read requests, two or more at a time, to N addresses calculated using the N indices, store the N read operands in a memory, in order, and provide the N operands, one at a time, in response to fetch requests from the processing engine.

19. The non-transitory computer-readable medium of claim 18, wherein the computing apparatus comprises one or more of a multiprocessor, a processing core, an embedded processor, or a multi-threaded processor.

20. The non-transitory computer-readable medium of claim 18, wherein the computing apparatus is further to comprise one or more additional processing engines, each associated with a unique IMF unit, the computing apparatus to further respond by fetching and decoding one or more additional instances of the instruction and using the one or more additional processing engines to respond to the one or more additional instances of the instruction.

* * * * *